United States Patent
Minamiru et al.

(10) Patent No.: US 12,261,414 B2
(45) Date of Patent: Mar. 25, 2025

(54) LIGHT-EMISSION DEVICE, OPTICAL DEVICE, AND INFORMATION PROCESSING DEVICE

(71) Applicant: FUJIFILM BUSINESS INNOVATION CORP., Tokyo (JP)

(72) Inventors: Takeshi Minamiru, Ebina (JP); Kenichi Ono, Ebina (JP); Satoshi Inada, Ebina (JP); Michiaki Murata, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 784 days.

(21) Appl. No.: 17/354,098

(22) Filed: Jun. 22, 2021

(65) Prior Publication Data

US 2021/0313776 A1  Oct. 7, 2021

Related U.S. Application Data

(63) Continuation of application No. PCT/JP2019/026711, filed on Jul. 4, 2019.

(30) Foreign Application Priority Data

Mar. 25, 2019  (JP) .................................. 2019-056926
Apr. 2, 2019  (JP) .................................. 2019-070390

(51) Int. Cl.
*H01S 5/042* (2006.01)
*G06F 21/32* (2013.01)
(Continued)

(52) U.S. Cl.
CPC ............ *H01S 5/4025* (2013.01); *G06F 21/32* (2013.01); *G06F 21/84* (2013.01); *G06V 20/653* (2022.01);
(Continued)

(58) Field of Classification Search
CPC .................................................. H01S 5/02257
See application file for complete search history.

(56) References Cited

U.S. PATENT DOCUMENTS

2013/0050779 A1   2/2013   Stowe et al.
2013/0083304 A1*  4/2013   Kondo ................ H01S 5/18358
                                                            355/55
(Continued)

FOREIGN PATENT DOCUMENTS

CN   104048224 A        9/2014
CN   107884066 A   *    4/2018   ........... G01B 11/026
(Continued)

OTHER PUBLICATIONS

English Translation of Xu (Year: 2018).*
(Continued)

*Primary Examiner* — Minsun O Harvey
*Assistant Examiner* — Stephen Sutton Kotter
(74) *Attorney, Agent, or Firm* — Oliff PLC

(57) ABSTRACT

A light-emission device includes: a first light emitting element chip; a second light emitting element chip having a light output higher than a light output of the first light emitting element chip, the second light emitting element chip being configured to be driven independently from the first light emitting element chip and arranged side by side with the first light emitting element chip; and a light diffusion member including a first region provided on an emission path of the first light emitting element chip and a second region provided on an emission path of the second light emitting element chip, and having a diffusion angle at the second region larger than a diffusion angle at the first region.

18 Claims, 13 Drawing Sheets

(51) Int. Cl.
  *G06F 21/84* (2013.01)
  *G06V 20/64* (2022.01)
  *H01S 5/40* (2006.01)
  *G06V 40/16* (2022.01)

(52) U.S. Cl.
  CPC ...... *G06V 40/165* (2022.01); *G06V 2201/121* (2022.01)

(56) References Cited

U.S. PATENT DOCUMENTS

| | | |
|---|---|---|
| 2014/0044438 A1 | 2/2014 | Takeda et al. |
| 2014/0254155 A1 | 9/2014 | Higashi et al. |
| 2015/0273863 A1 | 10/2015 | Stowe et al. |
| 2015/0334825 A1 | 11/2015 | Bahl et al. |
| 2015/0334826 A1 | 11/2015 | Karavakis et al. |
| 2016/0148893 A1 | 5/2016 | Bahl et al. |
| 2016/0278206 A1 | 9/2016 | Bahl et al. |
| 2018/0209616 A1 | 7/2018 | Lee et al. |
| 2019/0235351 A1* | 8/2019 | Lee ............... H05K 1/181 |
| 2019/0335073 A1 | 10/2019 | Yamashita et al. |

FOREIGN PATENT DOCUMENTS

| | | | |
|---|---|---|---|
| CN | 108347502 A | 7/2018 | |
| EP | 3078499 A2 | 10/2016 | |
| JP | H05-014162 A | 1/1993 | |
| JP | 2013-093571 A | 5/2013 | |
| JP | 2014-036027 A | 2/2014 | |
| JP | 2016-200808 A | 12/2016 | |
| JP | 2018-054769 A | 4/2018 | |
| JP | 2019-027783 A | 2/2019 | |
| TW | 201603661 A | 1/2016 | |
| WO | WO-2019039312 A1 * | 2/2019 | ............. G01S 17/08 |

OTHER PUBLICATIONS

English Translation of Akihto (Year: 2019).*
Aug. 20, 2019 Written Opinion issued in International Patent Application No. PCT/JP2019/026711.
Aug. 20, 2019 International Search Report issued in International Patent Application No. PCT/JP2019/026711.
Feb. 28, 2023 Office Action issued in Japanese Patent Application No. 2019-070390.
Jul. 25, 2023 Office Action issued in Japanese Patent Application No. 2019-074540.
Jul. 25, 2023 Office Action issued in Japanese Patent Application No. 2019-070390.
Aug. 20, 2019 International Search Report issued in International Patent Application No. PCT/JP2019/026937.
Aug. 20, 2019 Written Opinion issued in International Patent Application No. PCT/JP2019/026937.
Sep. 14, 2021 Office Action issued in Taiwanese Patent Application No. 109100947.
Aug. 7, 2024 Office Action issued in Chinese Patent Application No. 201980092188.8.
Aug. 28, 2024 Office Action issued in European Patent Application No. 19920992.5.

* cited by examiner

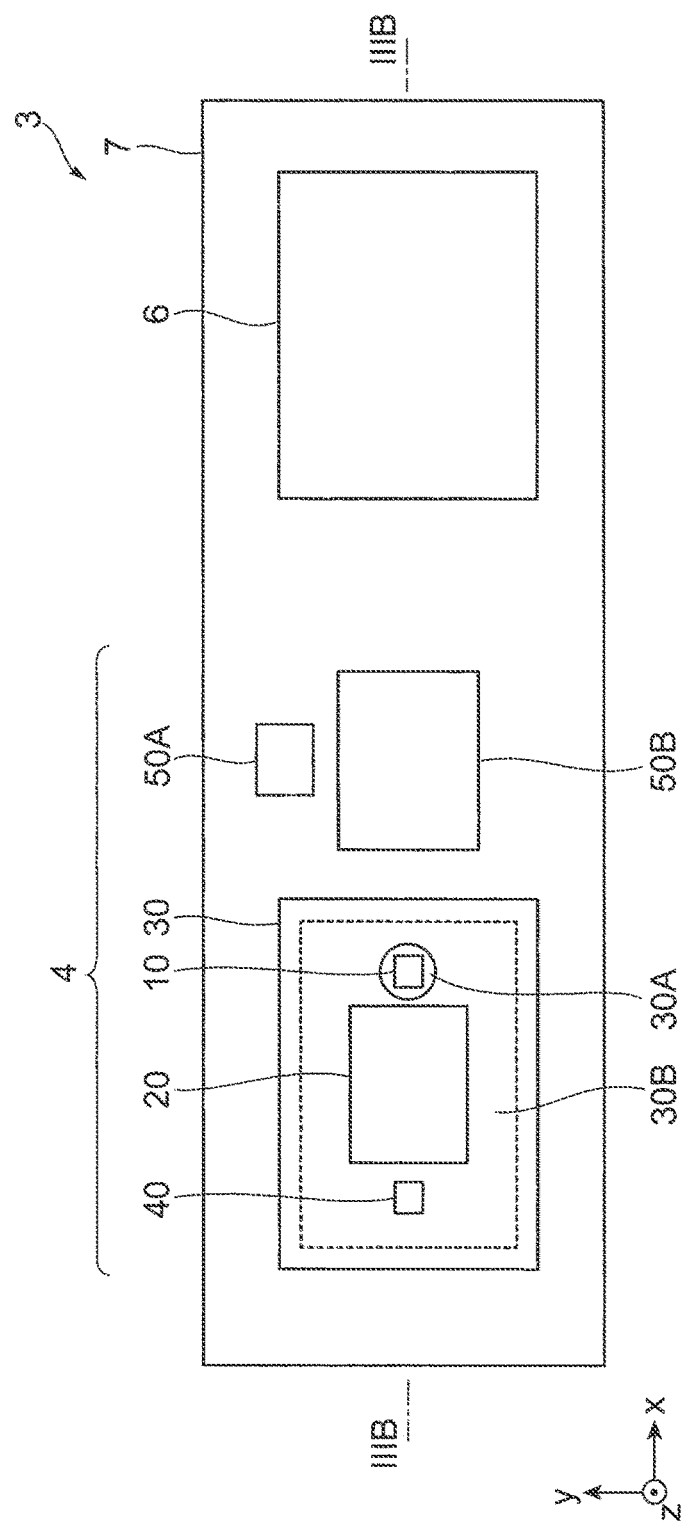
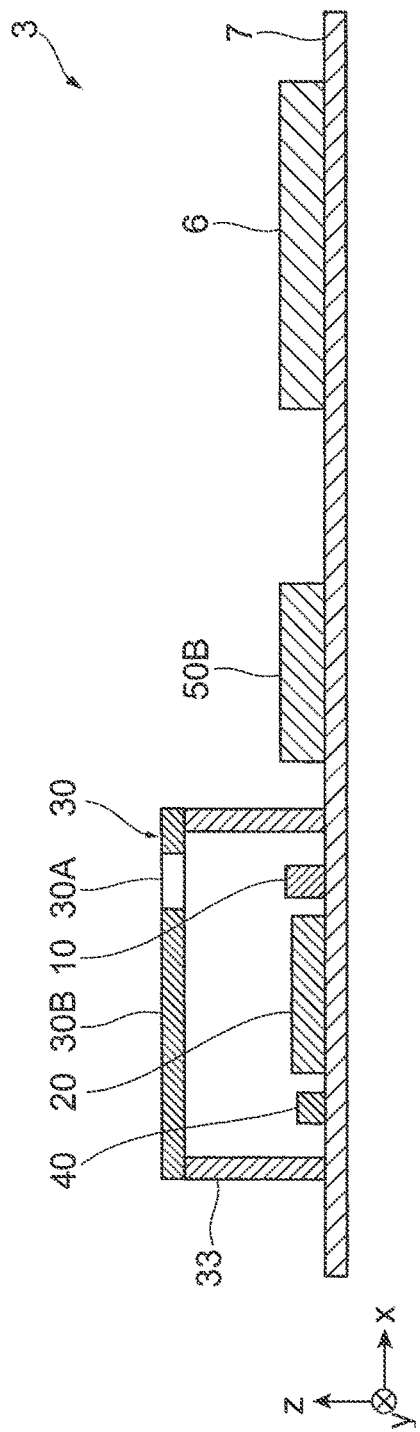
FIG. 3A
FIG. 3B

LIGHT-EMISSION DEVICE, OPTICAL DEVICE, AND INFORMATION PROCESSING DEVICE

CROSS-REFERENCE TO RELATED APPLICATIONS

This is a continuation of International Application No. PCT/JP2019/26711 filed on Jul. 4, 2019, and claims priority from Japanese Patent Application No. 2019-056926 filed on Mar. 25, 2019 and Japanese Patent Application No. 2019-070390 filed on Apr. 2, 2019.

BACKGROUND

Technical Field

The present invention relates to a light-emission device, an optical device, and an information processing device.

Related Art

JP-A-2018-54769 discloses an imaging apparatus including: a light source; a diffusion plate that includes plural lenses arranged adjacent to each other on a predetermined plane and diffuses light emitted from the light source; and an imaging element that receives reflected light generated by a subject reflecting the light diffused by the diffusion plate. Here, the plural lenses are arranged such that a period of interference fringes in the diffused light is three pixels or less.

SUMMARY

A configuration is known in which an object to be measured is diffusively irradiated with light emitted from a light emitting element chip via a light diffusion member so as to measure a three-dimensional shape of the object to be measured. In this case, from the viewpoint of energy saving and the like, a configuration including a light emitting element chip for proximity detection that detects whether or not an object to be measured is within a predetermined distance, and a light emitting element chip for three-dimensional measurement that diffusively irradiates, via a light diffusion member, the object to be measured with light having a light output higher than that of the light emitting element chip for proximity detection may be considered.

Here, when the light emitting element chip for proximity detection and the light emitting element chip for three-dimensional measurement are covered with a common light diffusion member, light for proximity detection is diffused by the light diffusion member in the same manner as light for three-dimensional measurement, and a light density may be lowered on an irradiation surface of the object to be measured, which may make it difficult to perform proximity detection.

Aspects of non-limiting embodiments of the present disclosure relate to providing a light-emission device including: a first light emitting element chip; and a second light emitting element chip having a light output higher than that of the first light emitting element chip, and configured to be driven independently from the first light emitting element chip, and in a configuration in which a light diffusion member is provided on emission paths of the first light emitting element chip and the second light emitting element chip, light emitted from the first light emitting element chip is prevented from being decreased in a light density on an irradiation surface as compared with a case where the light emitted from the first light emitting element chip is diffused by the light diffusion member at the same diffusion angle as light emitted from the second light emitting element chip.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a light-emission device, including: a first light emitting element chip; a second light emitting element chip having a light output higher than that of the first light emitting element chip, configured to be driven independently from the first light emitting element chip and arranged side by side with the first light emitting element chip; and a light diffusion member including a first region provided on an emission path of the first light emitting element chip and a second region provided on an emission path of the second light emitting element chip, and having a diffusion angle at the second region larger than a diffusion angle at the first region.

BRIEF DESCRIPTION OF DRAWINGS

Exemplary embodiment(s) of the present invention will be described in detail based on the following figures, wherein:

FIG. 3A illustrates a plan view of an optical device to which the present exemplary embodiment is applied;

FIG. 3B illustrates a cross-sectional view taken along a line IIIB-IIIB in FIG. 3A;

DETAILED DESCRIPTION

Hereinafter, an exemplary embodiment of the present invention will be described in detail with reference to the accompanying drawings.

In many cases, an information processing device identifies whether a user who accesses the information processing device is permitted to access the information processing device, and permits use of the information processing device which is an own device, only when it is authenticated that the user is permitted to access the information processing device. So far, methods of authenticating the user by a password, a fingerprint, an iris, or the like have been used. Recently, there is a demand for an authentication method having higher security. As this method, authentication based on a three-dimensional image such as a shape of a face of the user has been performed.

Here, the information processing device will be described as a portable information processing terminal as an example, and will be described as authenticating the user by recognizing the shape of the face captured as the three-dimensional image. The information processing device may be applied to an information processing device such as a personal computer (PC) other than the portable information processing terminal.

Further, configurations, functions, methods, and the like described in the following exemplary embodiment may be applied to recognition of a three-dimensional shape of an object other than the recognition of the shape of the face, and may also be applied to recognition of a shape of an object to be measured other than the face. Further, a distance to an object to be measured is not limited.

Information Processing Device 1

Figure 1:
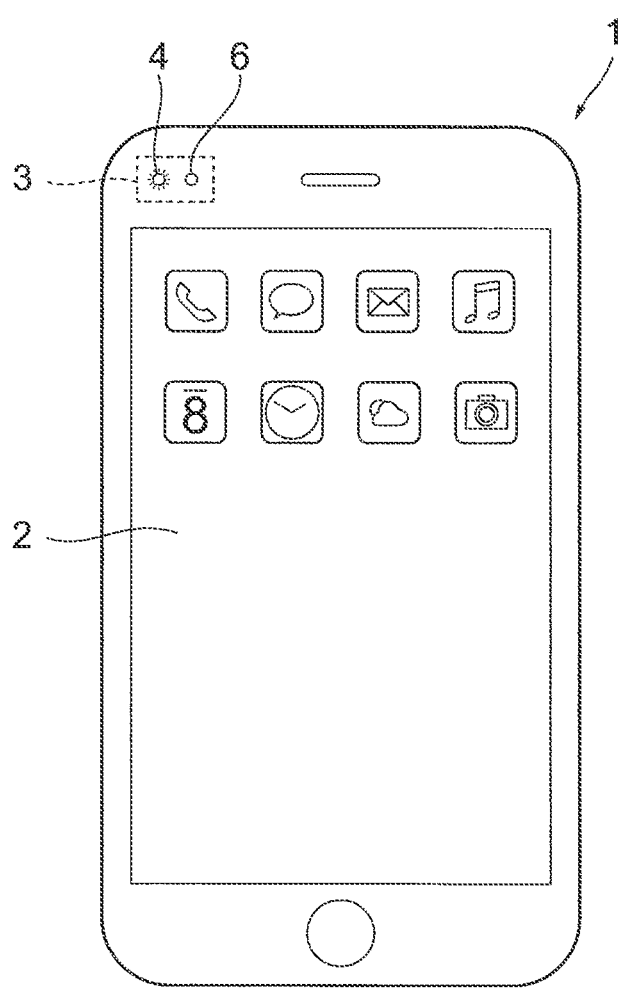
FIG. 1 is a diagram illustrating an example of an information processing device to which an exemplary embodiment is applied.

FIG. 1 is a diagram illustrating an example of an information processing device 1 to which the present exemplary embodiment is applied. As described above, the information processing device 1 is, for example, the portable information processing terminal.

The information processing device 1 includes a user interface unit (hereinafter, referred to as a UI unit) 2 and an optical device 3 that acquires a three-dimensional image. The UI unit 2 is configured by integrating, for example, a display device that displays information to a user and an input device with which instructions for information processing are inputted by an operation of the user. The display device is, for example, a liquid crystal display or an organic EL display, and the input device is, for example, a touch panel.

The optical device 3 includes a light-emission device 4 and a three-dimensional sensor (hereinafter, referred to as a 3D sensor) 6. The light-emission device 4 emits light toward an object to be measured, that is, a face in the example described here, in order to acquire a three-dimensional image. The 3D sensor 6 acquires light emitted by the light-emission device 4, reflected by a face, and returned. Here, a three-dimensional image of the face is acquired based on a so-called TOF (Time of Flight) method based on a flight time of light. Hereinafter, even when the object to be measured is a face, the face is simply referred to as an object to be measured.

The information processing device 1 is configured as a computer including a CPU (Central Processing Unit), a ROM (Read Only Memory), a RAM (Random Access Memory), and the like. The ROM includes a non-volatile rewritable memory, for example, a flash memory. Then, a program or a constant stored in the ROM is developed in the RAM and executed by the CPU, and thus the information processing device 1 operates, and various types of information processing are executed.

Figure 2:
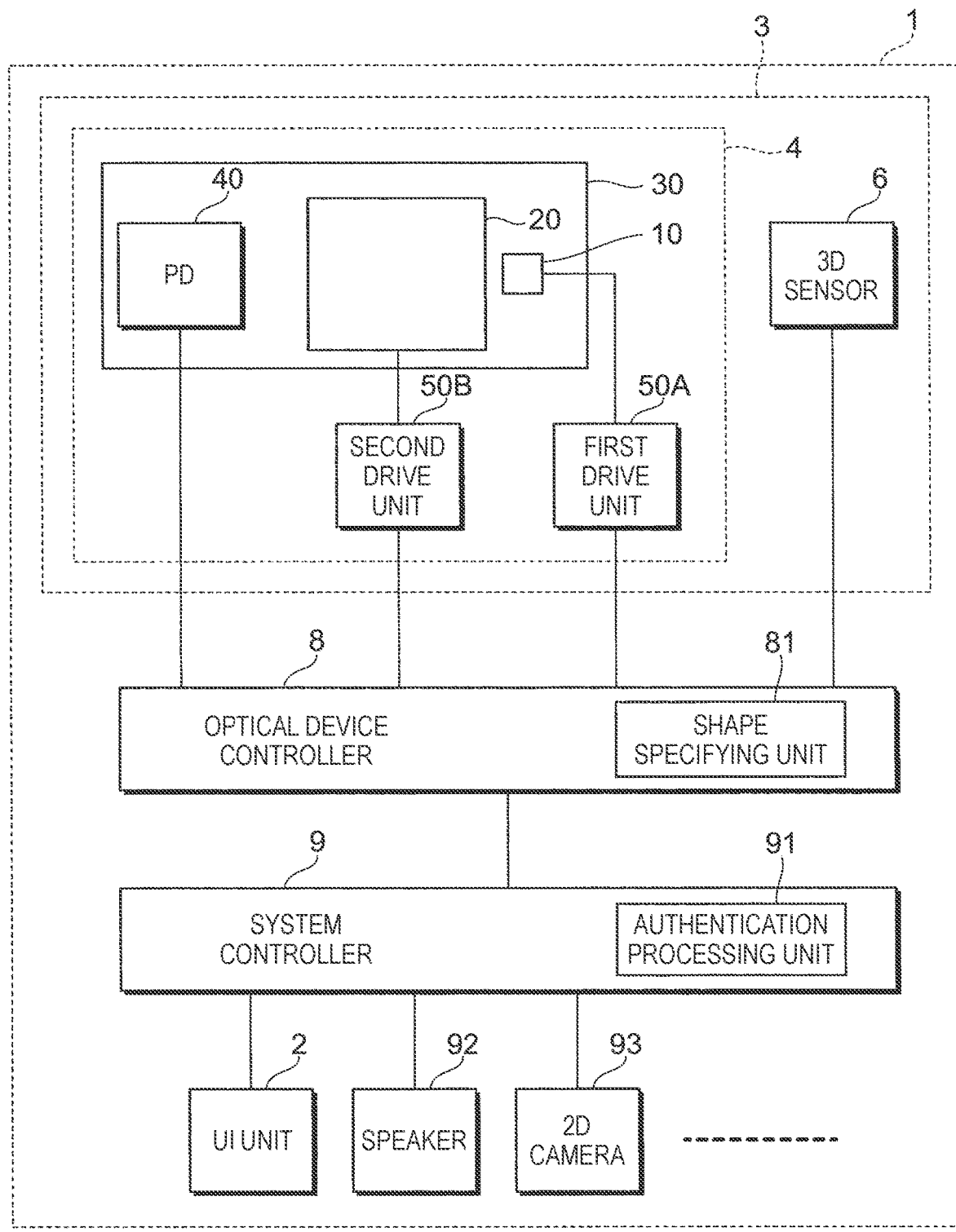
FIG. 2 is a block diagram illustrating a configuration of the information processing device according to the present exemplary embodiment.

FIG. 2 is a block diagram illustrating a configuration of the information processing device 1.

The information processing device 1 includes the optical device 3, an optical device controller 8, and a system controller 9. As described above, the optical device 3 includes the light-emission device 4 and the 3D sensor 6. The optical device controller 8 controls the optical device 3. The optical device controller 8 includes a shape specifying unit 81. The system controller 9 controls the entire information processing device 1 as a system. The system controller 9 includes an authentication processing unit 91. The UI unit 2, a speaker 92, a two-dimensional (2D) camera 93, and the like are connected to the system controller 9. The 3D sensor 6 is an example of a second light receiving unit, and the optical device controller 8 is an example of a control unit.

Hereinafter, the above components will be described in order.

As described above, the optical device 3 includes the light-emission device 4 and the 3D sensor 6. The light-emission device 4 includes a proximity detection chip 10, a 3D shape measurement chip 20, a diffusion plate 30, a light quantity monitoring light receiving element (also referred to as PD in FIG. 2) 40, a first drive unit 50A, and a second drive unit 50B. The proximity detection chip 10 is an example of a first light emitting element chip, the 3D shape measurement chip 20 is an example of a second light emitting element chip, the diffusion plate 30 is an example of a light diffusion member, and the light quantity monitoring light receiving element 40 is an example of a first light receiving unit.

The first drive unit 50A in the light-emission device 4 drives the proximity detection chip 10, and the second drive unit 50B drives the 3D shape measurement chip 20. For example, the proximity detection chip 10 and the 3D shape measurement chip 20 are driven so as to emit pulsed light (hereinafter, referred to as an emitted light pulse) of several tens of MHz or more and several hundreds of MHz or less.

As will be described later, the optical device 3 is configured such that light emitted from the proximity detection chip 10 and the 3D shape measurement chip 20 toward the object to be measured is reflected from the object to be measured, and the reflected light is received by the 3D sensor 6.

The 3D sensor 6 includes plural light receiving regions 61 (see FIG. 10 to be described later). The 3D sensor 6 outputs a signal corresponding to a time from when the light emitted from the proximity detection chip 10 is emitted to when the light is reflected by the object to be measured and received by the 3D sensor 6, and a signal corresponding to a time from when the light emitted from the 3D shape measurement chip 20 is emitted to when the light is reflected by the object to be measured and received by the 3D sensor 6. The 3D sensor 6 may include a condensing lens.

The light emitted from the proximity detection chip 10 and reflected by the object to be measured is an example of first reflected light, and the light emitted from the 3D shape measurement chip 20 and reflected by the object to be measured is an example of second reflected light.

The shape specifying unit 81 of the optical device controller 8 acquires, from the 3D sensor 6, a digital value obtained for each light receiving region 61, and calculates a distance to the object to be measured for each light receiving region 61, so as to specify a 3D shape of the object to be measured.

The authentication processing unit 91 of the system controller 9 performs authentication processing related to use of the information processing device 1 when the 3D shape of the object to be measured, which is a specification result, specified by the shape specifying unit 81, is a 3D shape stored in advance in the ROM or the like. The authentication processing related to the use of the information processing device 1 is, for example, processing as to whether or not to permit the use of the information processing device 1 which is an own device. For example, when a 3D shape of a face, which is the object to be measured, coincides with a face shape stored in a storage member such as the ROM, the use of the information processing device 1 including various applications and the like provided by the information processing device 1 is permitted.

The shape specifying unit 81 and the authentication processing unit 91 are configured by, for example, a program. Further, the shape specifying unit 81 and the authentication processing unit 91 may be configured by an integrated circuit such as an ASIC (Application Specific Integrated Circuit) or an FPGA (Field-Programmable Gate Array). The shape specifying unit 81 and the authentication processing unit 91 may be configured by software such as a program, and an integrated circuit.

In FIG. 2, the optical device 3, the optical device controller 8, and the system controller 9 are separately shown, but the system controller 9 may include the optical device controller 8. Further, the optical device controller 8 may be provided in the optical device 3. Further, the optical device 3, the optical device controller 8, and the system controller 9 may be configured integrally.

Overall Configuration of Optical Device 3

Next, the optical device 3 will be described in detail.

FIGS. 3A and 3B illustrate examples of a plan view and a cross-sectional view of the optical device 3 to which the present exemplary embodiment is applied. FIG. 3A is the plan view, and FIG. 3B is the cross-sectional view taken along a line IIIB-IIIB in FIG. 3A. Here, in FIG. 3A, a horizontal direction of a paper surface is defined as an x direction, and an upward direction of the paper surface is defined as a y direction. A direction orthogonal to the x direction and the y direction in a counterclockwise direction is defined as a z direction.

As shown in FIG. 3A, in the optical device 3, the light-emission device 4 and the 3D sensor 6 are arranged in a x direction on a circuit substrate 7. The circuit substrate 7 uses, as a base material, a plate-shaped member made of an insulation material, and is provided with conductor patterns made of a conductive material. The insulation material is made of, for example, ceramic, an epoxy resin, or the like. The circuit substrate 7 is provided with the conductor patterns made of a conductive material. The conductive material is, for example, a metal such as copper (Cu) or silver (Ag), or a conductive paste containing these metals. The circuit substrate 7 may be a single-layer substrate having conductor patterns provided on a front surface thereof, or may be a multilayer substrate having plural layers of conductor patterns. Further, the light-emission device 4 and the 3D sensor 6 may be arranged on different circuit substrates.

In the light-emission device 4, as an example, the light quantity monitoring light receiving element 40, the 3D shape measurement chip 20, the proximity detection chip 10, the first drive unit 50A, and the second drive unit 50B are arranged in order in a +x direction on the circuit substrate 7.

A shape of each of the proximity detection chip 10 and the 3D shape measurement chip 20 in a plan view, that is a planar shape, is a quadrangular shape, and both emit light in the same direction (z direction in FIG. 3B). The planar shape of each of the proximity detection chip 10 and the 3D shape measurement chip 20 may not be a quadrangular shape. The proximity detection chip 10 and the 3D shape measurement chip 20 may be directly mounted on the circuit substrate 7, or may be mounted on the circuit substrate 7 via a heat dissipation base material such as aluminum oxide or aluminum nitride. Hereinafter, the proximity detection chip 10 and the 3D shape measurement chip 20 will be described as being mounted directly on the circuit substrate 7. Hereinafter, the plan view means to be viewed from the z direction in FIG. 3A.

The first drive unit 50A for driving the proximity detection chip 10 and the second drive unit 50B for driving the 3D shape measurement chip 20 are arranged laterally adjacently in the y direction on the circuit substrate 7. A rated output of the first drive unit 50A is set to be smaller than a rated output of the second drive unit 50B. Therefore, an outer size of the first drive unit 50A is smaller than an outer size of the second drive unit 50B.

The second drive unit 50B needs to drive the 3D shape measurement chip 20 with a large current. Therefore, the second drive unit 50B is arranged more preferentially than the first drive unit 50A in order to reduce a distance from the second drive unit 50B to the 3D shape measurement chip 20. That is, the second drive unit 50B is arranged such that a wiring connected to the 3D shape measurement chip 20 has a wide pattern width. On the other hand, the first drive unit 50A is arranged at a position laterally displaced from the second drive unit 50B, that is, on a y direction side of the second drive unit 50B.

The proximity detection chip 10 is arranged on the circuit substrate 7 between the 3D shape measurement chip 20 and the second drive unit 50B. The light quantity monitoring light receiving element 40 is arranged on the circuit substrate 7 at a position close to the 3D shape measurement chip 20, that is, on a side opposite to a position where the second drive unit 50B is arranged with respect to the 3D shape measurement chip 20. In this way, the proximity detection chip 10, the 3D shape measurement chip 20, and the light quantity monitoring light receiving element 40 are arranged close to each other, which makes it easy to cover these components with a common diffusion plate 30. In contrast, when the proximity detection chip 10 and the 3D shape measurement chip 20 are arranged at a distance from each other, in order to cover these components with a common diffusion plate 30, a diffusion plate 30 having a large size is required.

As shown in FIG. 3A, a planar shape of the diffusion plate 30 is, for example, a rectangular shape. The planar shape of the diffusion plate 30 may not be a rectangular shape. As shown in FIG. 3B, the diffusion plate 30 is provided at a predetermined distance from the proximity detection chip 10 and the 3D shape measurement chip 20. Further, the diffusion plate 30 is supported by a side wall 33 on a light emission direction side of the proximity detection chip 10 and the 3D shape measurement chip 20. The diffusion plate 30 is provided so as to cover the light quantity monitoring light receiving element 40, the proximity detection chip 10, and the 3D shape measurement chip 20. The side wall 33 is provided so as to surround the light quantity monitoring light receiving element 40, the proximity detection chip 10, and the 3D shape measurement chip 20. When the side wall 33 is formed by a member that absorbs the light emitted from the proximity detection chip 10 and the 3D shape measurement chip 20, the light emitted from the proximity detection chip 10 and the 3D shape measurement chip 20 is prevented from being radiated to an outside through the side wall 33. Further, by sealing the proximity detection chip 10, the 3D shape measurement chip 20, and the like by the diffusion plate 30 and the side wall 33, dustproof, moisture-proof, and the like may be realized. In the present exemplary embodiment, the proximity detection chip 10, the 3D shape measurement chip 20, and the light quantity monitoring light receiving element 40 are arranged close to each other, which makes it easy to surround these components by a side wall 33 having a small size. In contrast, when the proximity detection chip 10 and the 3D shape measurement chip 20 are arranged at a distance from each other, in order to surround these components by a common side wall 33, a side wall 33 having a large size is required. When a configuration is employed in which two side walls 33 having a small size are prepared and the proximity detection chip 10 and the 3D shape measurement chip 20 are separately surrounded, the number of components is doubled. Since the side wall 33 is not provided between the proximity detection chip 10 and the 3D shape measurement chip 20, the light-emission device 4 is reduced in size as compared with a configuration in which the side wall 33 is provided between the proximity detection chip 10 and the 3D shape measurement chip 20.

The light quantity monitoring light receiving element 40 is, for example, a photodiode (PD) made of silicon or the like that outputs an electric signal corresponding to a received light quantity.

The light quantity monitoring light receiving element 40 receives light emitted from the 3D shape measurement chip 20 and reflected by a back surface of the diffusion plate 30, that is, a surface on a −z direction side. The light quantity monitoring light receiving element 40 may receive light emitted from the proximity detection chip 10 and reflected by the back surface of the diffusion plate 30.

The 3D shape measurement chip 20 is controlled, based on a light quantity (received light quantity) received by the light quantity monitoring light receiving element 40, by the optical device controller 8 so as to maintain a predetermined light output via the second drive unit 50B.

When the received light quantity of the light quantity monitoring light receiving element 40 is extremely lowered, the diffusion plate 30 may be detached or damaged, and thus the light emitted from the 3D shape measurement chip 20 may be directly emitted to the outside. In such a case, a light output of the 3D shape measurement chip 20 is prevented by the second drive unit 50B via the optical device controller 8. For example, emission of the light from the 3D shape measurement chip 20 is stopped.

In the light-emission device 4, the proximity detection chip 10 is driven by the first drive unit 50A to emit light for detecting proximity of the object to be measured. The 3D shape measurement chip 20 is driven by the second drive unit 50B to emit light for measuring a 3D shape of the object to be measured. The light quantity monitoring light receiving element 40 receives light reflected by the diffusion plate 30 among the light emitted from the 3D shape measurement chip 20, and monitors the light output of the 3D shape measurement chip 20. Then, the light output of the 3D shape measurement chip 20 is controlled via the second drive unit 50B based on the light output of the 3D shape measurement chip 20 monitored by the light quantity monitoring light receiving element 40. The light quantity monitoring light receiving element 40 may monitor a light output of the proximity detection chip 10 similarly to the 3D shape measurement chip 20.

Configurations of Proximity Detection Chip 10 and 3D Shape Measurement Chip 20

Figure 4:
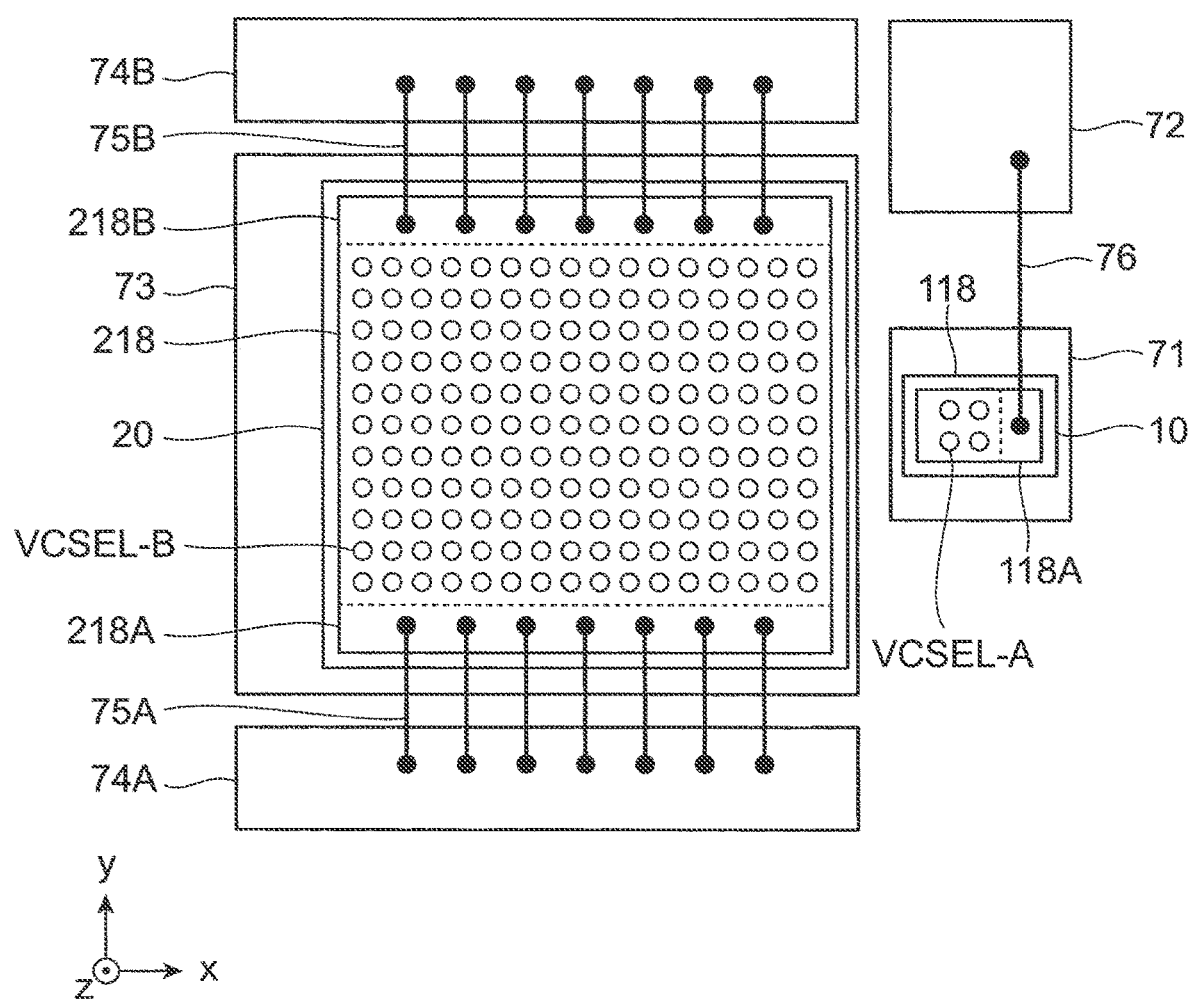
FIG. 4 is a diagram illustrating configurations of a proximity detection chip and a 3D shape measurement chip.

FIG. 4 is a diagram illustrating configurations of the proximity detection chip 10 and the 3D shape measurement chip 20. The proximity detection chip 10 includes vertical cavity surface emitting laser elements VCSELs (Vertical Cavity Surface Emitting Lasers)-A. On the other hand, the 3D shape measurement chip 20 includes vertical cavity surface emitting laser elements VCSELs-B. Hereinafter, the vertical cavity surface emitting laser element VCSEL-A is referred to as a VCSEL-A, and the vertical cavity surface emitting laser element VCSEL-B is referred to as a VCSEL-B. When the VCSEL-A and the VCSEL-B are not distinguished from each other, the VCSEL-A and the VCSEL-B is referred to as a VCSEL. The VCSEL-A is an example of a first light emitting element, and the VCSEL-B is an example of a second light emitting element.

The VCSEL is a light emitting element in which an active region serving as a light emitting region is provided between a lower multilayer film reflector and an upper multilayer film reflector that are stacked on a substrate and which emits a laser beam in a direction perpendicular to the substrate. Therefore, the VCSEL may be easily arranged in a two-dimensional array. Here, it is assumed that the proximity detection chip 10 includes one or more VCSELS-A, and the 3D shape measurement chip 20 includes plural VCSELs-B.

The VCSEL-A of the proximity detection chip 10 emits light for detecting whether or not the object to be measured is close to the information processing device 1. The VCSEL-B of the 3D shape measurement chip 20 emits light for measuring the 3D shape of the object to be measured. When face authentication is taken as an example, a measurement distance is about 10 cm to 1 m.

A range in which the 3D shape of the object to be measured is measured (hereinafter, referred to as a measurement range or an irradiation range, and this range is referred to as an irradiation surface) is about 1 m square.

In this case, the number of VCSELs-A provided in the proximity detection chip 10 is one or more and 50 or less. The number of VCSELs-B provided in the 3D shape measurement chip 20 is 100 or more and 1000 or less. That is, the number of the VCSELs-B of the 3D shape measurement chip 20 is larger than the number of the VCSELs-A of the proximity detection chip 10. As will be described later, plural VCSELs-A of the proximity detection chip 10 are connected in parallel to each other and driven in parallel. Similarly, plural VCSELs-B of the 3D shape measurement chip 20 are connected in parallel to each other and driven in parallel. The number of the VCSELs described above is an example, and may be set according to the measurement distance or the measurement range. The proximity detection chip 10 shown in FIG. 4 includes, for example, four VCSELs-A.

The proximity detection chip 10 is not required to irradiate the entire surface of the measurement range with light, and may detect whether or not the object to be measured is close to the measurement range. Therefore, the proximity detection chip 10 may irradiate a part of the measurement range with light. Therefore, the number of the VCSELs-A of the proximity detection chip 10 may be small. In order to detect whether or not the object to be measured is close to the information processing device 1, the proximity detection chip 10 irradiates the measurement range with light at a predetermined cycle when there is a request to use the information processing device 1. Therefore, the proximity detection chip 10 is required to have a low power consumption.

On the other hand, the 3D shape measurement chip 20 irradiates the entire surface of the measurement range with light when it is detected that the object to be measured is close to the measurement range. The 3D shape is specified based on reflected light received by the 3D sensor 6 from the measurement range. Therefore, the VCSEL-B of the 3D shape measurement chip 20 is required to have a large emitted light quantity. The 3D shape measurement chip 20 includes many VCSELs-B in order to uniformly irradiate the entire surface of the measurement range. The 3D shape measurement chip 20 emits light only when measuring the 3D shape, and thus is allowed to have a high power consumption.

VCSEL-A of Proximity Detection Chip 10

Next, the VCSEL-A of the proximity detection chip 10 will be described. The proximity detection chip 10 emits light in order to detect whether or not the object to be measured is close. Therefore, the VCSEL-A of the proximity detection chip 10 does not need to irradiate the entire surface of the measurement range with light, and is required to have a small spread angle of the emitted light and a small decrease in a light density with respect to a distance. As compared with a case where the spread angle of the emitted light is small with the same light output, a light density emitted to the object to be measured decreases when the spread angle of the emitted light is large. As a result, the reflected light received by the 3D sensor 6 is weakened, and it is difficult to detect the reflected light.

The light density means illuminance.

Here, for example, a single-mode VCSEL that oscillates in a single transverse mode, that is, in a single mode, is used as the VCSEL-A of the proximity detection chip 10. The single-mode VCSEL has a spread angle of emitted light smaller than that of a multi-mode VCSEL that oscillates in multiple transverse modes, that is, in multi-modes. Therefore, even if the light outputs are the same, the single-mode VCSEL has a higher light density on an irradiation surface than the multi-mode VCSEL. The spread angle of the emitted light means a full width at half maximum (FWHM: Full Width at Half Maximum) of the light emitted from the VCSEL (see θ1 and θ2 in FIG. 8B). Here, the single transverse mode means that an intensity profile of the emitted light having the spread angle as a parameter has a characteristic of being monomodal, that is, having one intensity peak, and for example, plural transverse modes may be included in a range in which the monomodality is maintained.

The VCSEL-A of the proximity detection chip 10 may be configured by using a VCSEL having a long resonator structure as the single-mode VCSEL.

The VCSEL having the long resonator structure increases a loss in a higher-order transverse mode by introducing, between an active region in a VCSEL having a general λ resonator structure in which a resonator length is an oscillation wavelength λ and one multilayer film reflector, a spacer layer of several λ to several tens of λ to increase the resonator length. As a result, the VCSEL having the long resonator structure enables single-mode oscillation having an oxidation aperture diameter larger than an oxidation aperture diameter of a VCSEL having a general λ resonator structure. In a VCSEL having a typical 2 resonator structure, a longitudinal mode interval (sometimes called a free spectrum range) is large, so that a stable operation may be obtained in a single longitudinal mode. In contrast, in the VCSEL having the long resonator structure, as the resonator length increases, a longitudinal mode interval is narrowed, and plural standing waves in the longitudinal mode exist in a resonator, and as a result, switching between the longitudinal modes is likely to occur. Therefore, in the VCSEL having the long resonator structure, it is required to prevent the switching between the longitudinal modes.

The VCSEL having the long resonator structure is easier to have a smaller spread angle than the single-mode VCSEL having the general λ resonator structure.

Figure 5:
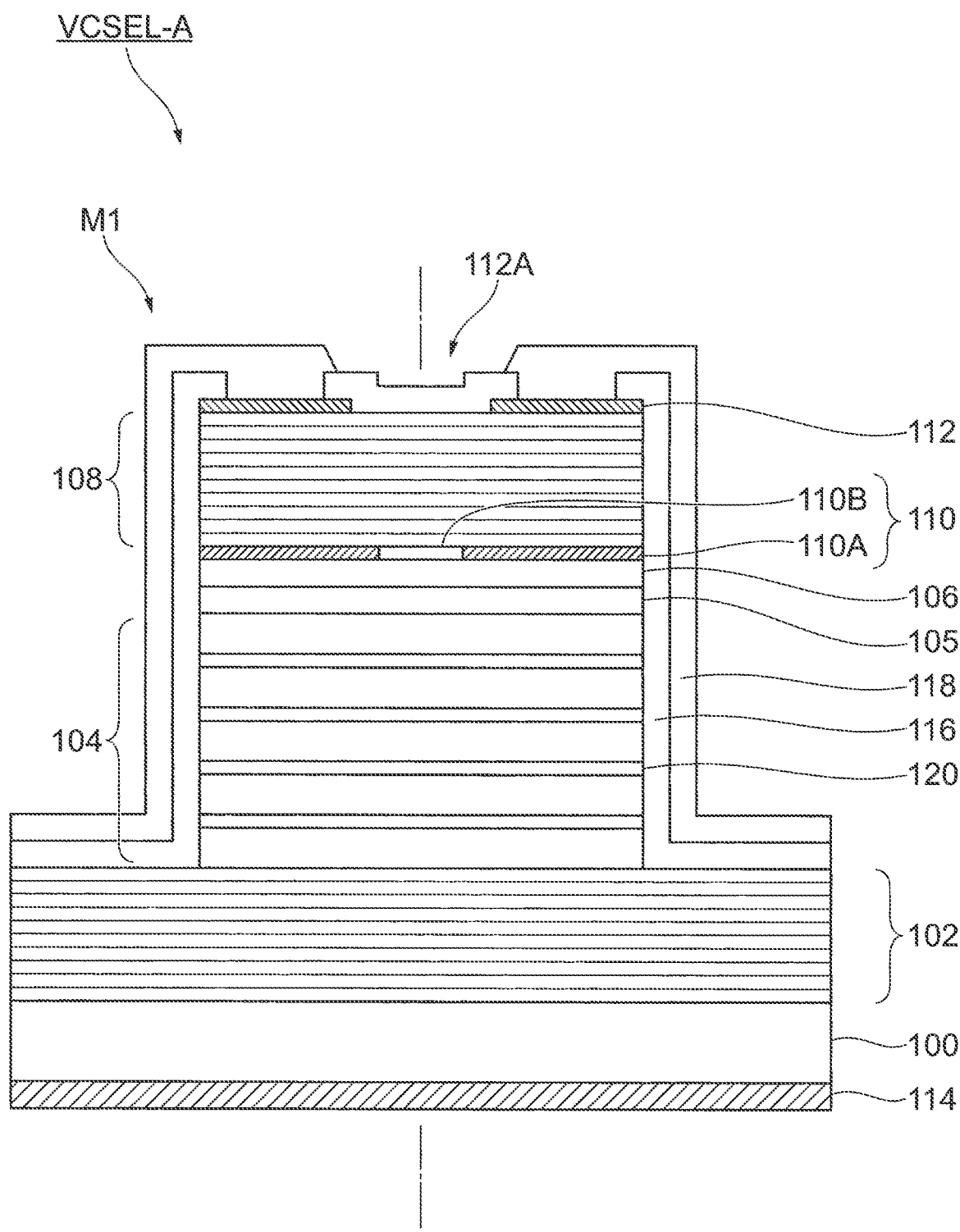
FIG. 5 is a diagram illustrating a cross-sectional structure of one VCSEL in the proximity detection chip.

FIG. 5 is a diagram illustrating a cross-sectional structure of one VCSEL-A in the proximity detection chip 10. The VCSEL-A is the VCSEL having the long resonator structure.

The VCSEL-A is configured by stacking, on an n-type GaAs substrate 100, an n-type lower distributed bragg reflector (DBR: Distributed Bragg Reflector) 102 in which AlGaAs layers having different Al compositions are alternately stacked, a resonator extension region 104 formed on the lower DBR 102 to extend a resonator length, an n-type carrier block layer 105 formed on the resonator extension region 104, an active region 106 formed on the carrier block layer 105 and including a quantum well layer sandwiched between an upper spacer layer and a lower spacer layer, and a p-type upper DBR 108 which is formed on the active region 106 and in which AlGaAs layers having different Al compositions are alternately stacked.

The n-type lower DBR 102 is a multi-layer stack of a pair of an $Al_{0.9}Ga_{0.1}As$ layer and a GaAs layer, a thickness of each layer is $\lambda/4n_r$ ($\lambda$ is an oscillation wavelength, and $n_r$ is a refractive index of a medium), and these layers are alternately stacked in 40 cycles. A carrier concentration after doping silicon, which is an n-type impurity, is, for example, $3 \times 10^{18}$ $cm^{-3}$.

The resonator extension region 104 is a monolithic layer formed by a series of epitaxial growth. The resonator extension region 104 is made of AlGaAs, GaAs, or AlAs such that a lattice constant thereof coincides with or matches that of the GaAs substrate. In order to emit a laser beam in a 940 nm band, the resonator extension region 104 is made of AlGaAs that does not cause light absorption. A film thickness of the resonator extension region 104 is set to 2 μm or more and 5 μm or less, and 5λ or more and 20λ or less based on the oscillation wavelength λ. Therefore, a moving distance of a carrier increases. Therefore, the resonator extension region 104 is desired to be an n-type having large carrier mobility, and thus is inserted between the n-type lower DBR 102 and the active region 106. Such a resonator extension region 104 may be referred to as a cavity extension region or a cavity space.

A carrier block layer 105 having a large band gap and made of, for example, $Al_{0.9}Ga_{0.1}As$ may be formed between the resonator extension region 104 and the active region 106. By inserting the carrier block layer 105, carrier leakage from the active region 106 is prevented, and light emission efficiency is improved. As will be described later, since an optical loss causing layer 120 that slightly attenuates an oscillation intensity of a laser beam is inserted into the resonator extension region 104, the carrier block layer 105 plays a role of compensating for such a loss. For example, a film thickness of the carrier block layer 105 is $\lambda/4$ $mn_r$ ($\lambda$ is an oscillation wavelength, m is an integer, and $n_r$ is a refractive index of a medium).

The active region 106 is configured by stacking the lower spacer layer, the quantum well active layer, and the upper spacer layer. For example, the lower spacer layer is an undoped $Al_{0.6}Ga_{0.4}As$ layer, the quantum well active layer is an undoped InGaAs quantum well layer and an undoped GaAs barrier layer, and the upper spacer layer is an undoped $Al_{0.6}Ga_{0.4}As$ layer.

The p-type upper DBR 108 is a stack of a p-type $Al_{0.9}Ga_{0.1}As$ layer and a GaAs layer, a thickness of each layer is $\lambda/4n_r$, and these layers are alternately stacked in 29 cycles. A carrier concentration after doping carbon, which is a p-type impurity, is, for example, $3\times10^{18}$ $cm^{-3}$. A contact layer made of p-type GaAs may be formed in an uppermost layer of the upper DBR 108, and a current constriction layer 110 of p-type AlAs is formed in a lowermost layer of the upper DBR 108 or inside thereof.

By etching semiconductor layers stacked from the upper DBR 108 to the lower DBR 102, a columnar mesa M1 is formed on the substrate 100, and the current constriction layer 110 is exposed to a side surface of the mesa M1. In the current constriction layer 110, an oxidized region 110A selectively oxidized from the side surface of the mesa M1 and a conductive region 110B surrounded by the oxidized region 110A are formed. The conductive region 110B is an oxidized aperture. In an oxidation step, an AlAs layer has a higher oxidation rate than an AlGaAs layer, and the oxidized region 110A is oxidized from the side surface of the mesa M1 toward an inside at a substantially constant rate, and thus a planar shape parallel to a substrate of the conductive region 110B is a shape that reflects an outer shape of the mesa M1, that is, a circular shape, and a center of the shape substantially coincides with an axis direction of the mesa M1 indicated by a dot-dash line. In the VCSEL-A having the long resonator structure, a diameter of the conductive region 110B for obtaining the single transverse mode may be made larger than that of a VCSEL having a normal 2 resonator structure, and for example, the diameter of the conductive region 110B may be increased to about 7 μm or more and 8 μm or less.

An annular p-side electrode 112 made of metal in which Ti/Au or the like is stacked is formed on an uppermost layer of the mesa M1. The p-side electrode 112 is in ohmic contact with the contact layer of the upper DBR 108. An inner side of the annular p-side electrode 112 serves as a light emission port 112A through which a laser beam is emitted to the outside. That is, the axis direction of the mesa M1 is an optical axis. Further, a cathode electrode 114 is formed as an n-side electrode on a back surface of the substrate 100. A front surface of the upper DBR 108 including the light emission port 112A is an emission surface.

Then, an insulating layer 116 is provided so as to cover a front surface of the mesa M1 except for a portion where the p-side electrode 112 and an anode electrode 118 to be described later are connected and the light emission port 112A. Further, the anode electrode 118 is provided so as to be in ohmic contact with the p-side electrode 112 except for the light emission port 112A. The anode electrode 118 is provided at a position except for a position of the light emission port 112A of each of the plural VCSELS-A. That is, in the plural VCSELs-A provided in the proximity detection chip 10, the p-side electrodes 112 are connected in parallel by the anode electrode 118.

In the VCSEL having the long resonator structure, plural longitudinal modes may exist in a reflection band defined by the resonator length, and thus it is necessary to prevent switching or popping between the longitudinal modes. Here, in order to set an oscillation wavelength band of a necessary longitudinal mode to 940 nm, and to prevent switching to an oscillation wavelength band of other longitudinal modes, the layer 120 for causing an optical loss of a standing wave in an unnecessary longitudinal mode is provided in the resonator extension region 104. That is, the optical loss causing layer 120 is introduced at a position of a node of a standing wave in a necessary longitudinal mode. The optical loss causing layer 120 is made of a semiconductor material having the same Al composition as a semiconductor layer constituting the resonator extension region 104, and is made of, for example, $Al_{0.3}Ga_{0.7}As$. The optical loss causing layer 120 may have a higher impurity doping concentration than a semiconductor layer constituting the resonator extension region 104, and for example, when an impurity concentration of AlGaAs constituting the resonator extension region 104 is $1\times10^{17}$ $cm^{-3}$, the optical loss causing layer 120 has an impurity concentration of $1\times10^{18}$ $cm^{-3}$, and is configured such that the impurity concentration is higher by one order of magnitude than that of other semiconductor layers. When the impurity concentration is increased, absorption of light by the carrier is increased, resulting in loss. A film thickness of the optical loss causing layer 120 is selected so as not to increase a loss to the necessary longitudinal mode, and may be about the same as a film thickness of the current constriction layer 110 located at the node of the standing wave (about 10 nm or more and 30 nm or less).

The optical loss causing layer 120 is inserted so as to be located at the node with respect to the standing wave in the necessary longitudinal mode. Since the node of the standing wave has a low intensity, an influence of a loss of the optical loss causing layer 120 on the necessary longitudinal mode is small. On the other hand, with respect to the standing wave in the unnecessary longitudinal mode, the optical loss causing layer 120 is located at an antinode other than the node. Since the antinode of the standing wave has an intensity larger than that of the node, the optical loss causing layer 120 causes larger loss to the unnecessary longitudinal mode. In this way, by reducing the loss to the necessary longitudinal mode and increasing the loss to the unnecessary longitudinal mode, the unnecessary longitudinal mode is selectively prevented from resonating, and longitudinal mode hopping is prevented.

The optical loss causing layer 120 does not necessarily need to be provided at a position of each node of the standing wave in the necessary longitudinal mode of the resonator extension region 104, and may be a single layer. In this case, since an intensity of the standing wave increases as approaching the active region 106, the optical loss causing layer 120 may be formed at a position of a node close to the active region 106. Further, when the switching or the popping between the longitudinal modes is allowed, the optical loss causing layer 120 may not be provided.

VCSEL-B of 3D Shape Measurement Chip 20

Next, the VCSEL-B of the 3D shape measurement chip 20 will be described.

Here, the 3D shape measurement chip 20 emits light in order to specify the 3D shape of the object to be measured. Therefore, a predetermined measurement range is irradiated with a predetermined light density. Therefore, here, the VCSEL-B of the 3D shape measurement chip 20 may be configured by a multi-mode VCSEL that tends to be higher in output rather than the single-mode VCSEL.

Figure 6:
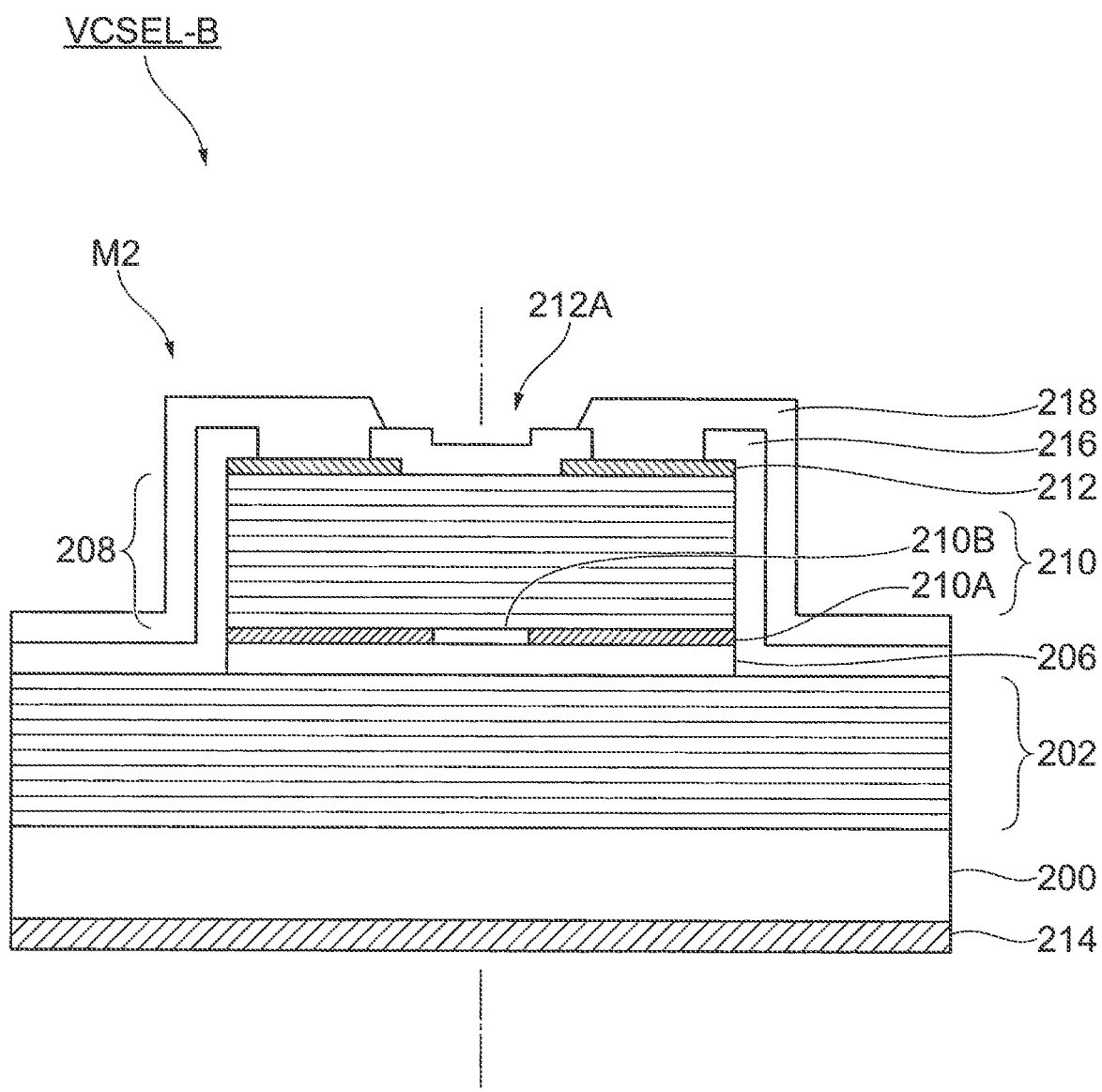
FIG. 6 is a diagram illustrating a cross-sectional structure of one VCSEL in the 3D shape measurement chip.

FIG. 6 is a diagram illustrating a cross-sectional structure of one VCSEL-B in the 3D shape measurement chip 20. The VCSEL-B is the VCSEL having the general 2 resonator structure described above. That is, the VCSEL-B does not include the resonator extension region 104 in the VCSEL-A described above.

The VCSEL-B is configured by stacking, on an n-type GaAs substrate 200, an n-type lower DBR 202 in which AlGaAs layers having different Al compositions are alternately stacked, an active region 206 formed on the lower DBR 202 and including a quantum well layer sandwiched between an upper spacer layer and a lower spacer layer, and a p-type upper DBR 208 which is formed on the active region 206 and in which AlGaAs layers having different Al compositions are alternately stacked. A current constriction layer 210 of p-type AlAs is formed in a lowermost layer of the upper DBR 208 or inside thereof.

Since the lower DBR 202, the active region 206, the upper DBR 208, and the current constriction layer 210 are the same as the lower DBR 102, the active region 106, the upper DBR 108, and the current constriction layer 110 of the VCSEL-A described above, descriptions thereof will be omitted.

By etching semiconductor layers stacked from the upper DBR 208 to the lower DBR 202, a columnar mesa M2 is formed on the substrate 200, and the current constriction layer 210 is exposed to a side surface of the mesa M2. In the current constriction layer 210, an oxidized region 210A selectively oxidized from the side surface of the mesa M2 and a conductive region 210B surrounded by the oxidized region 210A are formed. The conductive region 210B is an oxidized aperture. A planar shape parallel to a substrate of the conductive region 210B is a shape that reflects an outer shape of the mesa M2, that is, a circular shape, and a center of the shape substantially coincides with a central axis direction of the mesa M2 indicated by a dot-dash line.

An annular p-side electrode 212 made of metal in which Ti/Au or the like is stacked is formed on an uppermost layer of the mesa M2, and the p-side electrode 212 is in ohmic contact with a contact layer of the upper DBR 208. A circular light emission port 212A whose center coincides with an axis direction of the mesa M2 is formed in the p-side electrode 212, and a laser beam is emitted to the outside from the light emission port 212A. That is, the axis direction of the mesa M2 is an optical axis. Further, a cathode electrode 214 is formed as an n-side electrode on a back surface of the substrate 200. A front surface of the upper DBR 208 including the light emission port 212A is an emission surface.

An insulating layer 216 is provided so as to cover a front surface of the mesa M2 except for a portion where the p-side electrode 212 and an anode electrode 218 to be described later are connected and the light emission port 212A. The anode electrode 218 is provided so as to be in ohmic contact with the p-side electrode 212 except for the light emission port 212A. The anode electrode 218 is provided at a position except for a position of the light emission port 212A of each of the plural VCSELs-B. That is, in the plural VCSELs-B constituting the 3D shape measurement chip 20, the p-side electrodes 212 are connected in parallel by the anode electrode 218.

Figure 7:
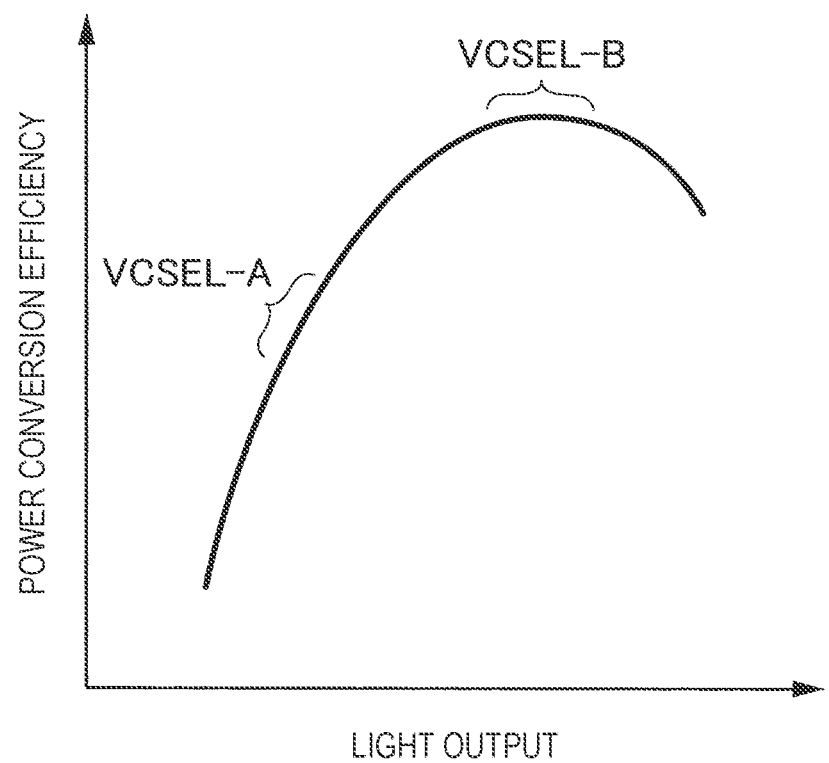
FIG. 7 is a diagram illustrating a relationship between a light output and power conversion efficiency of a general VCSEL.

FIG. 7 is a diagram illustrating a relationship between a light output and power conversion efficiency of a general VCSEL.

Generally, the VCSELs have maximum power conversion efficiency when the light output of one VCSEL is 4 mW or more and 8 mW or less. However, in a range where the power conversion efficiency is maximized, a spread angle is larger as compared with a case where the light output is used in a range smaller than the range. Therefore, an increase in a light density on the irradiation surface is not proportional to an increase in the light output.

Here, the VCSELs-A of the proximity detection chip 10 may be driven so as to be in a range of the light output in which the power conversion efficiency is reduced. That is, by intentionally causing the VCSEL-A to emit light at a light output lower than that in the range in which the power conversion efficiency may be maximized, the VCSEL-A is made to emit light at a small spread angle. In a case where the light density is insufficient on the irradiation surface, the light density is increased while maintaining a small spread angle by increasing the number of VCSELs-A instead of increasing the light output per VCSEL-A. The light output of one of the VCSELS-A is set to, for example, 1 mW or more and 4 mW or less. The number of the VCSELs-A in the proximity detection chip 10 is, for example, one or more and 50 or less as described above. In the configurations shown in FIG. 4, as described above, in order to increase the light density while avoiding the range (4 mW or more and 8 mW or less) in which the power conversion efficiency may be maximized, the proximity detection chip 10 includes the plural VCSELs-A.

On the other hand, the VCSELs-B of the 3D shape measurement chip 20 may be driven so as to be in a range of the light output in which the power conversion efficiency may be maximized. The light output of one of the VCSELs-B is set to, for example, 4 mW or more and 8 mW or less. The number of the VCSELs-B in the 3D shape measurement chip 20 is, for example, 100 or more and 1000 or less as described above.

Configuration of Diffusion Plate 30

Next, the diffusion plate 30 will be described.

Figure 8A:
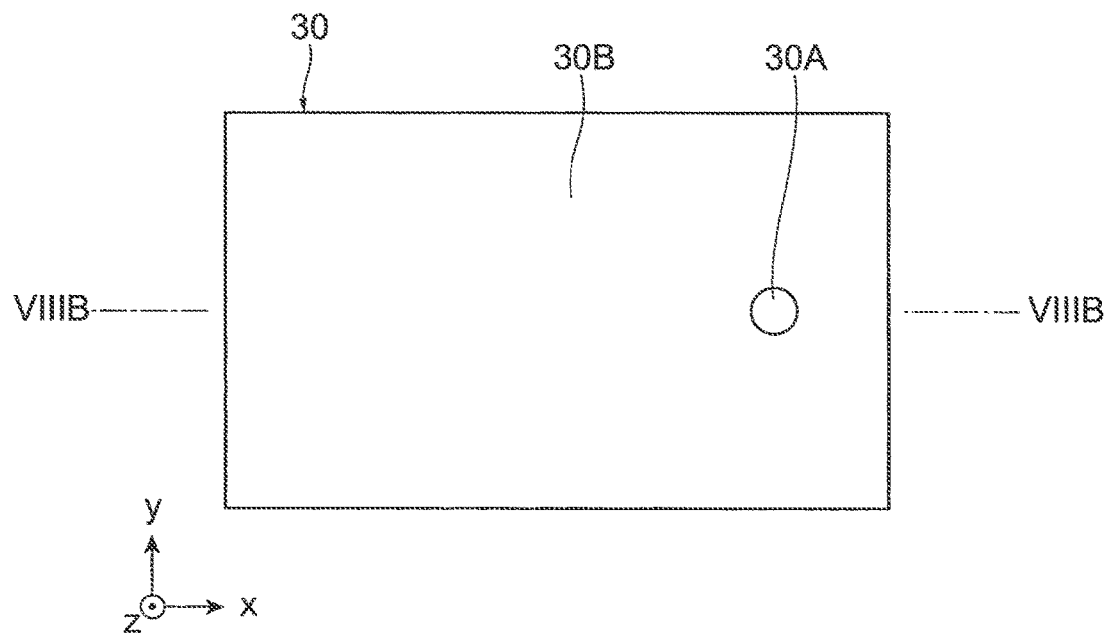
FIG. 8A illustrates a plan view of an example of a configuration of a diffusion plate.
Figure 8B:
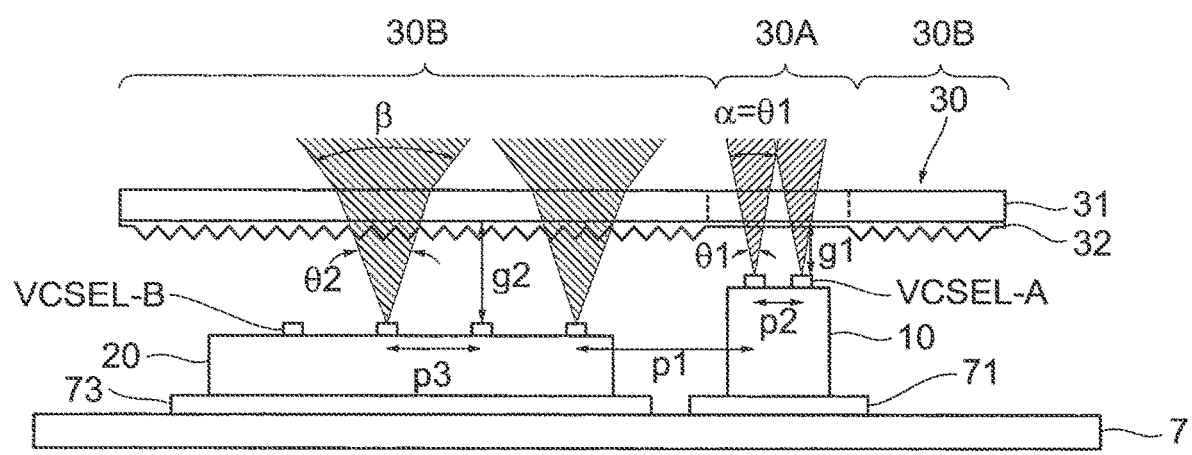
FIG. 8B is a cross-sectional view taken along a line VIIIB-VIIIB in FIG. 8A.

FIGS. 8A and 8B are diagrams illustrating an example of a configuration of the diffusion plate 30. FIG. 8A is a plan view, and FIG. 8B is a cross-sectional view taken along a line VIIIB-VIIIB in FIG. 8A.

As shown in FIGS. 3A and 3B, the diffusion plate 30 is provided on a side to which the proximity detection chip 10 and the 3D shape measurement chip 20 emit light, and diffuses the light emitted from each of the proximity detection chip 10 and the 3D shape measurement chip 20. That is, the diffusion plate 30 has a function of further increasing a spread angle of light incident on the diffusion plate 30.

As shown in FIG. 8A, the diffusion plate 30 includes a first region 30A and a second region 30B. In other words, the diffusion plate 30 is configured as a member in which the first region 30A and the second region 30B are integrated. The first region 30A is provided on an emission path of the light from the VCSEL-A of the proximity detection chip 10, and the second region 30B is provided on an emission path of the light from the 3D shape measurement chip 20. That is, as shown in FIG. 3A, when the light-emission device 4 is viewed from a front surface (in a plan view), the first region 30A of the diffusion plate 30 is provided to face a position where the proximity detection chip 10 is arranged, and the second region 30B of the diffusion plate 30 is provided to face the 3D shape measurement chip 20. In a case where the proximity detection chip 10 and the 3D shape measurement chip 20 are covered with the common diffusion plate 30, when the light from the proximity detection chip 10 is also diffused by the diffusion plate 30, proximity detection is difficult. Therefore, in order to use the common diffusion plate 30, the diffusion plate 30 includes the first region 30A and the second region 30B as described above. In the present exemplary embodiment, the proximity detection chip 10 and the 3D shape measurement chip 20 are arranged close to each other. This is because when a distance between the proximity detection chip 10 and the 3D shape measurement chip 20 is too long, a diffusion plate larger than necessary is required when the common (integrated) diffusion plate 30 is employed.

As described above, in the present exemplary embodiment, a small diffusion plate 30 in which the first region 30A and the second region 30B are integrated is employed.

A diffusion angle at the second region 30B of the diffusion plate 30 is set to be larger than that of the first region 30A. For example, as shown in FIG. 8B, the diffusion plate 30 includes a resin layer 32 in which irregularities for diffusing light are formed on one surface of a flat glass substrate 31 whose both surfaces are parallel to each other. The first region 30A and the second region 30B are different in a shape of the irregularities, and the diffusion angle is set to be larger in the second region 30B. The diffusion angle means a spread angle of light transmitted through the diffusion plate 30.

Here, the first region 30A is not provided with irregularities, and is configured not to diffuse the light. For example, the resin layer 32 of the diffusion plate 30 is provided with irregularities in the second region 30B, but is configured to be flat without providing irregularities in the first region 30A. Further, for example, in the first region 30A of the diffusion plate 30, a surface of the flat glass substrate 31 whose both surfaces are parallel to each other is exposed. Here, the first region 30A does not need to be completely flat, and may be provided with an irregular shape as long as a diffusion angle thereof is smaller than that of the second region 30. The first region 30A of the diffusion plate 30 may be a through hole through which the light passes. When the first region 30A of the diffusion plate 30 is the through hole, the light is not diffused as in the case where the first region 30A is flat.

As shown in FIG. 8B, the VCSEL-A of the proximity detection chip 10 is arranged at a position facing the first region 30A of the diffusion plate 30. On the other hand, the VCSEL-B of the 3D shape measurement chip 20 is arranged at a position facing the second region 30B of the diffusion plate 30. A spread angle of emitted light of the VCSEL-A is set as $\theta 1$, and a spread angle of emitted light of the VCSEL-B is set as $\theta 2$. $\theta 1$ is smaller than $\theta 2$ (that is, $\theta 1<\theta 2$).

When the light emitted from the VCSEL-A passes through the first region 30A in which no irregularities are provided, the light is not diffused, and is transmitted as it is with the spread angle $\theta 1$ of the emitted light being a diffusion angle $\alpha$.

On the other hand, when the light emitted from the VCSEL-B passes through the second region 30B in which the irregularities are provided, the light is diffused, and light having a diffusion angle $\beta$ larger than the spread angle $\theta 2$ of the emitted light is emitted from the diffusion plate 30.

The spread angles $\theta 1$ and $\theta 2$ and the diffusion angles $\alpha$ and $\beta$ are full width at half maximum (FWHM).

As described above, the diffusion plate 30 is configured such that a diffusion angle at the first region 30A is smaller than a diffusion angle at the second region 30B. In this way, the emitted light from the VCSEL-B of the 3D shape measurement chip 20 is further diffused in the second region 30B and emitted to the outside. As a result, as compared with a case where the emitted light from the VCSEL-B is emitted to the outside without being diffused in the second region 30B, an irradiation pattern having higher uniformity may be obtained on a wider irradiation surface. The second region 30B may be configured to have a uniform diffusion angle over the entire second region 30B, or may be configured such that diffusion angle differs according to a position in the second region 30B. Further, the second region 30B may be configured such that an optical axis of the VCSEL-B and a central axis of the light after the diffusion coincide with each other, or may be formed such that an irradiation area is increased by intentionally shifting the central axis of the light after the diffusion with respect to the optical axis of the VCSEL-B.

The first region 30A may be provided with an optical element that reduces the spread angle $\theta 1$ of the emitted light of the VCSEL-A of the proximity detection chip 10. Such an optical element may be obtained by, for example, setting the first region 30A into a convex lens shape. Here, reducing the spread angle includes not only a case where incident light is condensed, but also a case where incident light is set to be parallel light and is diffused, but a degree of diffusion is reduced.

A size of the first region 30A may be determined in consideration of the number of the VCSELs-A of the proximity detection chip 10, a spread angle $\theta$ of the emitted light, an intensity of the emitted light, or the like. As an example, in a case where the proximity detection chip 10 is used for face authentication, when the proximity detection chip 10 is configured such that, for example, the number of the VCSELs-A is in a range of one or more and 50 or less, the first region 30A may have a lateral width and a longitudinal width in a range of 50 μm or more and 500 μm or less. Further, in FIG. 8A, a front surface shape of the first region 30A in a plan view is circular, but may be a square, a rectangle, a polygon, or a combination thereof. Further, the lateral width and the longitudinal width of the first region 30A, that is, the size of the first region 30A may be set based on the light output of the proximity detection chip 10. For example, the first region 30A may be set in a range larger than a region of a full width at half maximum of the light emitted from the proximity detection chip 10 and smaller than a region having 0.1% intensity. Further, in a case where it is desired to set the VCSEL-A and the VCSEL-B closer to each other, the first region 30A may be set in a range smaller than a region having 1% intensity or a range smaller than a region having 5% intensity.

A size of the diffusion plate 30 including the first region 30A and the second region 30B may be set such that a lateral width and a longitudinal width are 1 mm or more and 10 mm or less, and a thickness is 0.1 mm or more and 1 mm or less, for example. The diffusion plate 30 may cover the proximity detection chip 10, the 3D shape measurement chip 20, and the light quantity monitoring light receiving element 40 in a plan view. Further, an example in which the diffusion plate 30 has a rectangular shape in a plan view is shown, but the diffusion plate 30 may have another shape such as a polygonal shape and a circular shape. When the diffusion plate 30 has the size and the shape as described above, a light diffusion member suitable for, in particular, face authentication of the portable information processing terminal and relatively short distance measurement up to about several meters is provided.

Positional Relationship of Diffusion Plate 30, VCSEL-A of Proximity Detection Chip 10, and VCSEL-B of 3D Shape Measurement Chip 20

A positional relationship between the VCSEL-A of the proximity detection chip 10 and the VCSEL-B of the 3D shape measurement chip 20 will be described with reference to FIG. 8B. Here, an arrangement interval between the VCSEL-A of the proximity detection chip 10 and the VCSEL-B of the 3D shape measurement chip 20 which are adjacent to each other is referred to as p1, an interval between the VCSELs-A of the proximity detection chip 10 is set to p2, and an interval between the VCSELs-B of the 3D shape measurement chip 20 is set to p3.

At this time, as seen from FIG. 8B, when the VCSEL-B is too close to the proximity detection chip 10, that is, the interval p1 reduces, light having a large light intensity emitted from the VCSEL-B passes through the first region 30A of the diffusion plate 30, and is likely to be emitted to the outside in a state where the light is not diffused or diffusion is weak. For this reason, a sufficient distance may be provided between the adjacent VCSEL-A and VCSEL-B. For example, the VCSEL-B of the 3D shape measurement chip 20 adjacent to the first region 30A of the diffusion plate 30 may be arranged such that a range of the spread angle θ2 of the emitted light does not overlap the first region 30A of the diffusion plate 30. In this way, as compared with a case where the range of the spread angle θ2 of the emitted light of the VCSEL-B of the 3D shape measurement chip 20 overlaps the first region 30A of the diffusion plate 30, a quantity of the light emitted from the VCSEL-B of the 3D shape measurement chip 20 and passing through the first region 30A of the diffusion plate 30 is reduced.

For example, the arrangement interval p1 between the VCSEL-A of the proximity detection chip 10 and the VCSEL-B of the 3D shape measurement chip 20 which are adjacent to each other may be larger than the interval p3 between the VCSELs-B of the 3D shape measurement chip 20.

Further, the spread angle θ1 of the emitted light of the VCSEL-A of the proximity detection chip 10 is set to be smaller than the spread angle θ2 of the emitted light of the VCSEL-B of the 3D shape measurement chip 20. However, in a case where a distance from the light emission port 112A (see FIG. 5) of the VCSEL-A of the proximity detection chip 10 to the diffusion plate 30 is referred to as a distance g1, and a distance from the light emission port 212A of the VCSEL-B of the 3D shape measurement chip 20 to the diffusion plate 30 is referred to as a distance g2, when the distance g1 is smaller than the distance g2 (that is, g1<g2), as shown in FIG. 8B, even when the first region 30A of the diffusion plate 30 is small, it is easy for the emitted light from the VCSEL-A of the proximity detection chip 10 to pass through the first region 30A and to be emitted to the object to be measured. That is, the light emission port 112A of the VCSEL-A of the proximity detection chip 10 may be arranged closer to the diffusion plate 30 than the light emission port 212A of the VCSEL-B of the 3D shape measurement chip 20.

In this way, it easy to reduce an area of the first region 30A of the diffusion plate 30. Then, since the quantity of the light emitted from the VCSEL-B of the 3D shape measurement chip 20 and passing through the first region 30A is further reduced as the area of the first region 30A reduces, the VCSEL-B of the 3D shape measurement chip 20 may be arranged closer to the proximity detection chip 10. That is, a region (dead space) where the VCSEL-B cannot be arranged and is generated between the VCSEL-A of the proximity detection chip 10 and the VCSEL-B of the 3D shape measurement chip 20 which are adjacent to each other, is reduced, and sizes of the diffusion plate 30 and the side wall 33 are reduced.

Since the VCSEL-B of the 3D shape measurement chip 20 has a larger light output than the VCSEL-A of the proximity detection chip 10, a temperature is likely to rise. Therefore, when the interval p3 between the VCSELs-B of the 3D shape measurement chip 20 is larger than the interval p2 between the VCSELS-A of the proximity detection chip 10 (that is, p3>p2), the temperature rise is prevented. On the other hand, since the VCSEL-A of the proximity detection chip 10 has a smaller light output than the VCSEL-B of the 3D shape measurement chip 20, a temperature is less likely to rise. Therefore, when the interval p2 which is a distance between the VCSELs-A of the proximity detection chip 10 is made smaller than the interval p3 which is a distance between the VCSELs-B of the 3D shape measurement chip 20, it is easy to reduce an occupied area of the proximity detection chip 10.

Further, as shown in FIG. 8A, the first region 30A of the diffusion plate 30 may be set to a state of being surrounded by the second region 30B from four directions. In this way, as compared with FIGS. 9A and 9B to be described later, the light emitted from the VCSEL-B of the 3D shape measurement chip 20 is prevented from passing through the first region of the diffusion plate 30.

Next, modifications of the diffusion plate 30 will be described.

Figure 9A:
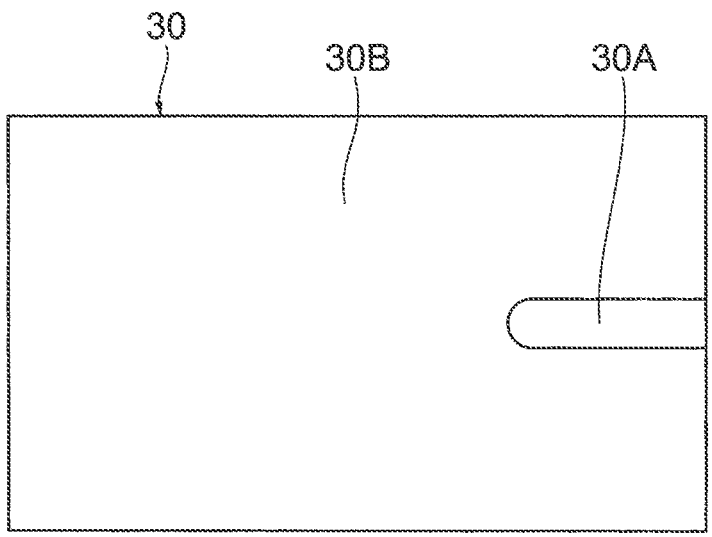
FIG. 9A is a diagram a first modification of the diffusion plate.
Figure 9B:
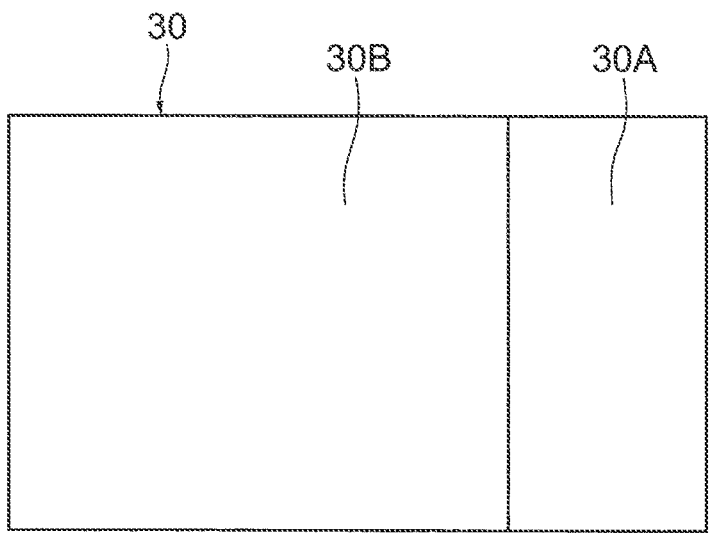
FIG. 9B is a diagram a second modification of the diffusion plate.

FIGS. 9A and 9B are diagrams illustrating the modifications of the diffusion plate 30. FIG. 9A is a first modification of the diffusion plate 30, and FIG. 9B is a second modification of the diffusion plate 30.

In the first modification of the diffusion plate 30 shown in FIG. 9A, a planar shape of the first region 30A of the diffusion plate 30 is a slit shape extending in the +x direction. In this way, a margin with respect to the arrangement in +x directions is widened. In this case, the first region is also surrounded by the second region, the light emitted from the VCSEL-B of the 3D shape measurement chip 20 is prevented from passing through the first region of the diffusion plate 30.

On the other hand, in the second modification of the diffusion plate 30 shown in FIG. 9B, the first region 30A of the diffusion plate 30 is provided at a right end portion (+x direction side) of the diffusion plate 30. In the second modification, the first region is not surrounded by the second region. Therefore, in the second modification of the diffusion plate 30, as compared with the first modification of the diffusion plate 30, among light emitted from the VCSEL-B of the 3D shape measurement chip 20, a quantity of light passing through the first region 30A of the diffusion plate 30 increases. However, in a configuration on an assumption that the light emitted from the VCSEL-B of the 3D shape measurement chip 20 is allowed to pass through the first region 30A, such as a case where the light output of the VCSEL-B of the 3D shape measurement chip 20 is small or a case where a distance between the VCSEL-B of the 3D shape measurement chip 20 and the first region 30A is long in a plan view, the second modification of the diffusion plate 30 may be employed. In such a case, the light emitted from the VCSEL-B of the 3D shape measurement chip 20 is prevented from passing through the first region of the diffusion plate 30.

Here, the first region being surrounded by the second region means a state in which the second region 30B is present at least in two or more directions in a plan view.

Configuration of 3D Sensor 6

Figure 10:
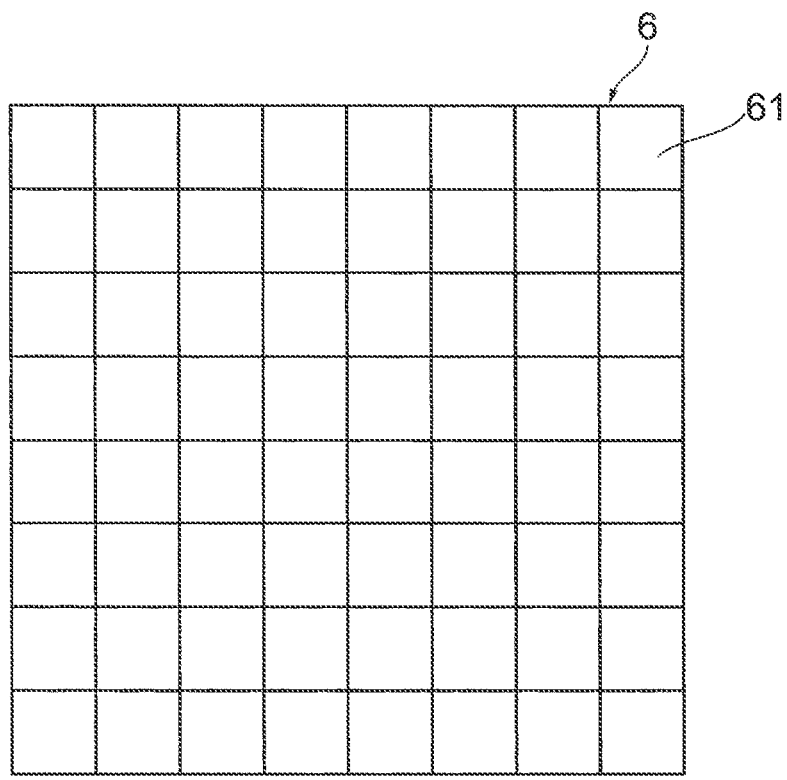
FIG. 10 is a diagram illustrating a 3D sensor.

FIG. 10 is a diagram illustrating the 3D sensor 6.

The 3D sensor 6 is configured by arranging the plural light receiving regions 61 in a matrix (lattice) shape. The 3D sensor 6 receives a light receiving pulse which is reflected light from the object to be measured with respect to an emitted light pulse from the light-emission device 4, and stores, in each light receiving region 61, electric charge corresponding to a time until the light is received. The 3D sensor 6 is configured as, for example, a device having a CMOS structure in which each light receiving region 61 includes two gates and electric charge storage units corresponding thereto. The 3D sensor 6 is configured to transfer generated photoelectrons to one of the two electric charge storage units at a high speed by alternately applying pulses to the two gates, and store electric charge corresponding to a phase difference between the emitted light pulse and the light receiving pulse. Then, a digital value corresponding to the electric charge corresponding to the phase difference between the emitted light pulse and the light receiving pulse for each light receiving region 61 is outputted as a signal via an AD converter. That is, the 3D sensor 6 outputs a signal corresponding to a time from when the light is emitted from the proximity detection chip 10 to when the light is received by the 3D sensor 6, and a signal corresponding to a time from when the light is emitted from the 3D shape measurement chip 20 to when the light is received by the 3D sensor 6.

Flowchart of Authentication Processing in Information Processing Device 1

Figure 11:
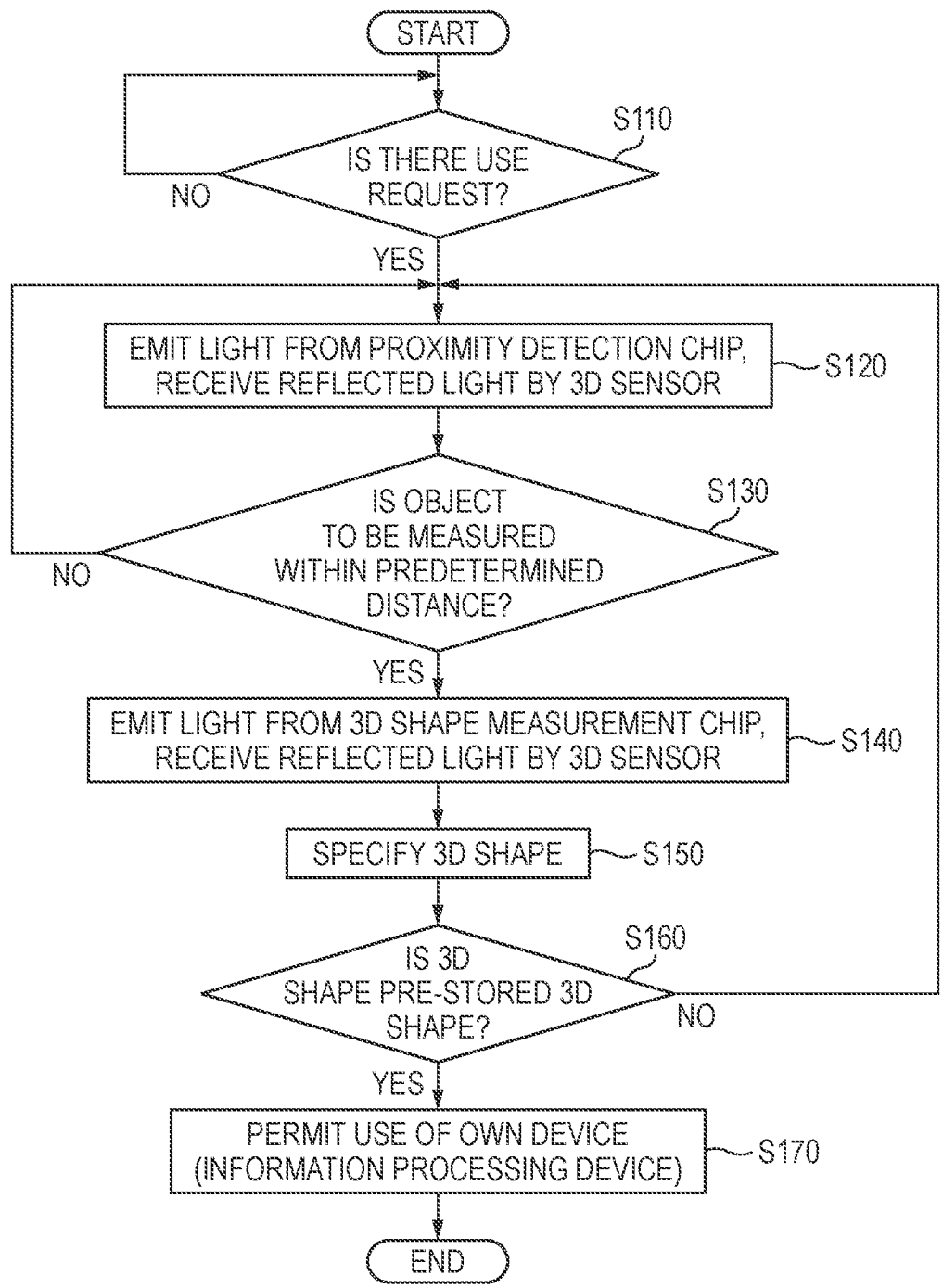
FIG. 11 is a flowchart illustrating authentication processing related to use of the information processing device.

FIG. 11 is a flowchart for performing authentication processing related to use of the information processing device 1.

Here, it is assumed that the information processing device 1 includes at least an off state in which a power source is turned off, a standby state in which the power source is supplied to only a part of the information processing device 1, and an operation state in which the power source is supplied to a larger number of parts than in the standby state, for example, the entire information processing device 1.

First, it is determined whether or not there is a request to use the information processing device 1 (step 110, the step is referred to as S110 in FIG. 11, and the same applies to the below). A case where there is a use request means a case where the power source is turned on in the off state, and a case where an operation is performed by a user in order to use the information processing device 1 in the standby state, or the like. A case where a telephone, a mail, or the like is received in the standby state, that is, a case where the system controller 9 receives a signal for shifting the information processing device 1 to the operation state is also an example of the case where there is a use request.

When it is determined to be negative (NO) in step 110, that is, when the off state or the standby state of the information processing device 1 continues, step 110 is to be repeated.

On the other hand, when it is determined to be positive (YES) in step 110, that is, when the information processing device 1 shifts to the operation state, the proximity detection chip 10 irradiates an object to be measured with light, and the 3D sensor 6 receives reflected light from the object to be measured (step 120). Regardless of whether or not there is a use request in step 110, the proximity detection chip 10 may continuously emit light in the standby state of the information processing device 1.

Next, it is determined whether or not the object to be measured is close to the information processing device 1 (step 130). Being close means that the object to be measured is within a predetermined distance. When it is determined to be negative (NO) in step 130, that is, when the object to be measured is not close to the information processing device 1, the process returns to step 120.

On the other hand, when it is determined to be positive (YES) in step 130, that is, when the object to be measured is close to the information processing device 1, the 3D shape measurement chip 20 emits light, and the 3D sensor 6 receives the reflected light from the object to be measured (step 140). At this time, the irradiation of the light from the proximity detection chip 10 may be stopped or continued. When the irradiation from the proximity detection chip 10 is continued, an irradiation pattern on an irradiation surface tends to be more uniform as compared with a case where the irradiation is not continued.

Then, a 3D shape of the object to be measured is specified by the shape specifying unit 81 of the optical device controller 8 based on a light quantity received by the 3D sensor 6 (step 150).

Next, it is determined whether or not the 3D shape, which is a specification result specified by the authentication processing unit 91, is a predetermined shape (step 160). When it is determined to be positive (YES) in step 160, that is, when the specified 3D shape coincides with a shape stored in advance, the use of the information processing device 1 is permitted (step 170). On the other hand, when it is determined to be negative (NO) in step 160, that is, when the specified 3D shape does not coincide with the shape stored in advance in the ROM or the like, the use of the information processing device 1 which is the own device is not permitted, and the process returns to step 120. In addition to the 3D shape, other information such as a two-dimensional image acquired by the 2D camera 93 may be added to determine the permission to use the information processing device 1 which is the own device.

As described above, the information processing device 1 according to the present exemplary embodiment includes the proximity detection chip 10 and the 3D shape measurement chip 20. It is determined whether or not an object to be measured is close to the information processing device 1 based on irradiation with the light from the proximity detection chip 10, and when the object to be measured is close to the information processing device 1, light for 3D measurement is emitted from the 3D shape measurement chip 20. That is, the 3D shape measurement chip 20 is prevented from emitting light even though the object to be measured is not close to the information processing device 1. At this time, by setting the light output of the proximity detection chip 10 smaller than the light output of the 3D shape measurement chip 20, power consumption is reduced. When the information processing device 1 is the portable information processing terminal, a decrease in a charge amount of a battery is prevented.

Connection Relationship of Proximity Detection Chip 10 and 3D Shape Measurement Chip 20 with Circuit Substrate 7

Next, a connection relationship of the proximity detection chip 10 and the 3D shape measurement chip 20 with the conductor patterns provided on the circuit substrate 7 will be described with reference to FIG. 4.

On the circuit substrate 7, a cathode pattern 71 and an anode pattern 72 for the proximity detection chip 10, and a cathode pattern 73 and anode patterns 74A and 74B for the 3D shape measurement chip 20 are provided as the conductor patterns.

As described above, the proximity detection chip 10 is provided with the cathode electrode 114 on the back surface thereof and is provided with the anode electrode 118 on the front surface thereof (see FIG. 5). The anode electrode 118 includes a pad unit 118A to which four p-side electrodes 112 of the VCSELs-A are connected, and to which a bonding wire 76 to be described later is connected.

Similarly, the 3D shape measurement chip 20 is provided with the cathode electrode 214 on the back surface thereof and is provided with the anode electrode 218 on the front surface thereof (see FIG. 6). The anode electrode 218 includes pad units 218A and 218B extending in ty direction sides while being formed to connect the anode electrodes 218 of the VCSELs-B arranged in a matrix, and to which bonding wires 75A and 75B to be described later are connected.

The cathode pattern 71 for the proximity detection chip 10 is formed in an area larger than that of the proximity detection chip 10 such that the cathode electrodes 114 provided on the back surface of the proximity detection chip 10 are connected. In the proximity detection chip 10, the cathode electrodes 114 provided on the back surface and the cathode pattern 71 for the proximity detection chip 10 on the circuit substrate 7 are adhered by a conductive adhesive. The pad unit 118A of the anode electrode 118 of the proximity detection chip 10 is connected to the anode pattern 72 on the circuit substrate 7 by the bonding wire 76.

Similarly, the cathode pattern 73 for the 3D shape measurement chip 20 is formed in an area larger than that of the 3D shape measurement chip 20 such that the cathode electrodes 214 provided on the back surface of the 3D shape measurement chip 20 are connected. The 3D shape measurement chip 20 is adhered to the cathode pattern 73 for the 3D shape measurement chip 20 by a conductive adhesive or the like.

The anode patterns 74A and 74B for the 3D shape measurement chip 20 are provided to face two facing sides (±y direction sides) of the anode electrode 218 (see FIG. 6) provided on the front surface of the 3D shape measurement chip 20. Then, the anode patterns 74A and 74B and the pad units 218A and 218B of the anode electrode 218 of the 3D shape measurement chip 20 are connected by the bonding wires 75A and 75B, respectively. Although plural bonding wires 75A and plural bonding wires 75B are provided, one of the bonding wires 75A is denoted by a reference numeral and one of the bonding wires 75B is denoted by a reference numeral.

Drive Method

When it is desired to drive the proximity detection chip 10 and the 3D shape measurement chip 20 at a higher speed, both the proximity detection chip 10 and the 3D shape measurement chip 20 may be low-side driven. The low-side drive means a configuration in which a driving unit such as a MOS transistor is located downstream in a current path with respect to a driving target such as a VCSEL. Conversely, a configuration in which a driving unit is located upstream is referred to as high-side drive. In the present exemplary embodiment, in order to low-side drive both the proximity detection chip 10 and the 3D shape measurement chip 20, the cathodes of the both are separated and independently driven.

Figure 12:
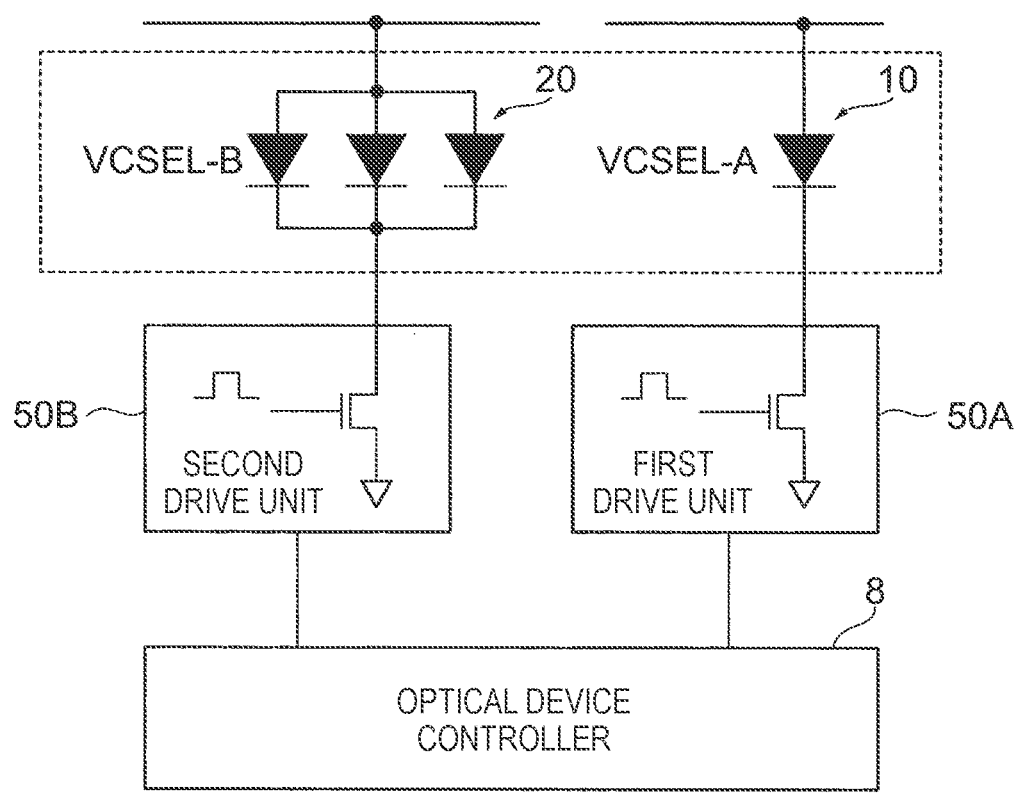
FIG. 12 is a diagram illustrating low-side drive.

FIG. 12 is a diagram illustrating the low-side drive. FIG. 12 shows a relationship among the VCSELS-A of the proximity detection chip 10, the VCSELs-B of the 3D shape measurement chip 20, the first drive unit 50A, the second drive unit 50B, and the optical device controller 8. The first drive unit 50A and the second drive unit 50B are grounded via a MOS transistor. That is, by turning on or turning off the MOS transistor, a cathode side of the VCSEL is turned on or off, and thus the low-side drive is performed.

In FIG. 12, the VCSELs-A of the proximity detection chip 10 and the VCSELs-B of the 3D shape measurement chip 20 are also separated from each other on an anode side.

Arrangement of Proximity Detection Chip 10, 3D Shape Measurement Chip 20, and Light Quantity Monitoring Light Receiving Element 40 in Light-Emission Device 4

Figure 13A:
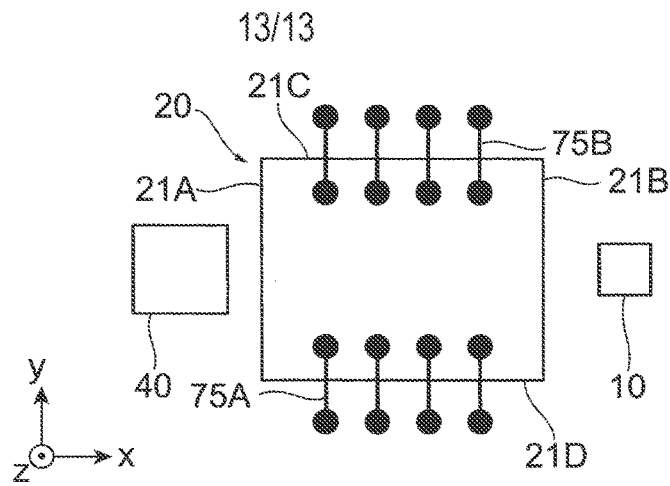
FIG. 13A is a diagram illustrating an arrangement of the proximity detection chip, the 3D shape measurement chip, and a light quantity monitoring light receiving element in the light-emission device described as the present exemplary embodiment.
Figure 13B:
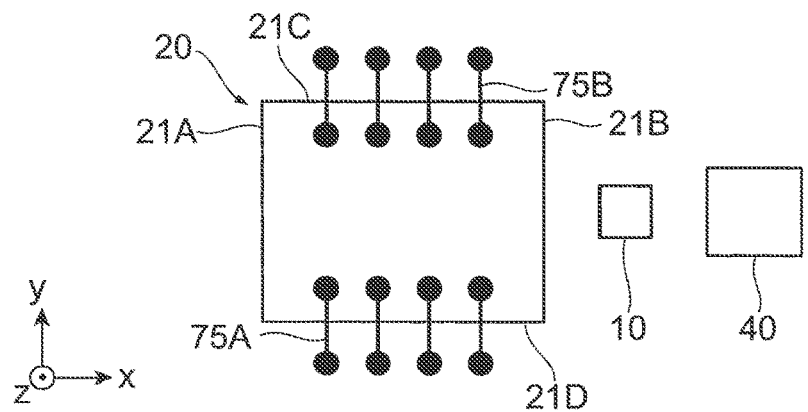
FIG. 13B is a diagram illustrating an arrangement of the proximity detection chip, the 3D shape measurement chip, and a light quantity monitoring light receiving element in the light-emission device according to a first modification of the arrangement.
Figure 13C:
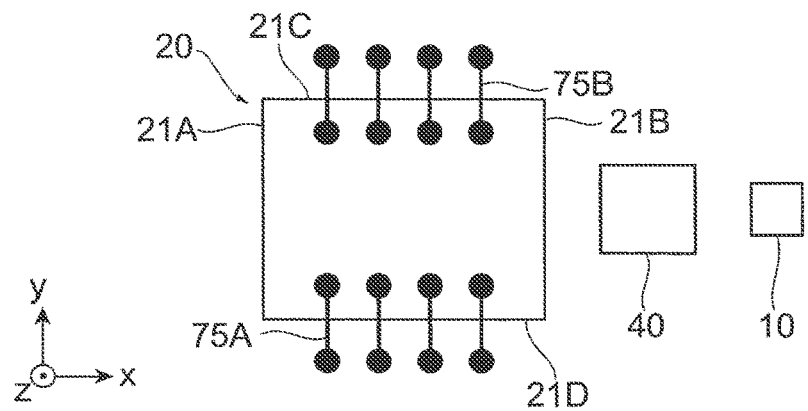
FIG. 13C is a diagram illustrating an arrangement of the proximity detection chip, the 3D shape measurement chip, and a light quantity monitoring light receiving element in the light-emission device according to s a second modification of the arrangement.
Figure 13D:
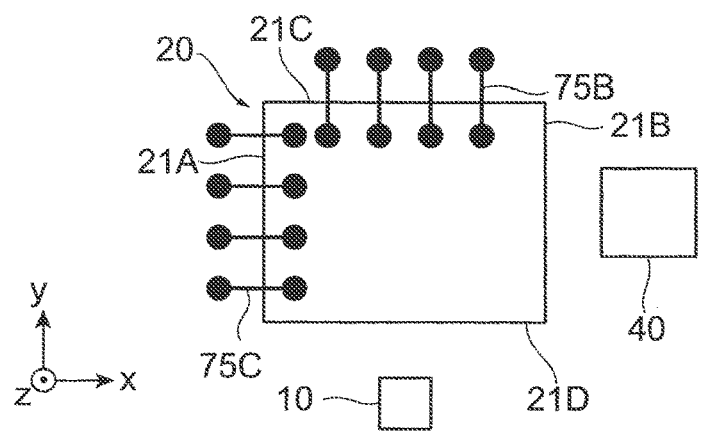
FIG. 13D is a diagram illustrating an arrangement of the proximity detection chip, the 3D shape measurement chip, and a light quantity monitoring light receiving element in the light-emission device according to a third modification of the arrangement.

FIGS. 13A-13D are diagrams illustrating an arrangement of the proximity detection chip 10, the 3D shape measurement chip 20, and the light quantity monitoring light receiving element 40 in the light-emission device 4. FIG. 13A is an arrangement described as the present exemplary embodiment, FIG. 13B is a first modification of the arrangement, FIG. 13C is a second modification of the arrangement, and FIG. 13D is a third modification of the arrangement. Here, the proximity detection chip 10, the 3D shape measurement chip 20, the light quantity monitoring light receiving element 40, and the bonding wires are shown, and other descriptions will be omitted. A side surface in a −x direction of the 3D shape measurement chip 20 having a quadrangular planar shape is referred to as a side surface 21A, a side surface in the +x direction is referred to as a side surface 21B, a side surface in a +y direction is referred to as a side surface 21C, and a side surface in the −y direction is referred to as a side surface 21D. Here, the side surface 21A and the side surface 21B are opposite to each other, and the side surface 21C and the side surface 21D are connected by the side surface 21A and the side surface 21B and are opposite to each other. The side surface 21A is an example of a first side surface, the side surface 21B is an example of a second side surface, the side surface 21C is an example of a third side surface, and the side surface 21D is an example of a fourth side surface.

In the arrangement (see FIG. 3A) described as the present exemplary embodiment shown in FIG. 13A, the light quantity monitoring light receiving element 40 is provided on a side surface 21A side in the −x direction of the 3D shape measurement chip 20. The proximity detection chip 10 is provided on a side surface 21B side in the +x direction of the 3D shape measurement chip 20. The bonding wires 75A and 75B connecting the anode electrode 218 (see FIG. 6) of the 3D shape measurement chip 20 and the anode patterns 74A and 74B (see FIG. 4) provided on the circuit substrate 7 are provided so as to face a side surface 21C side and a side surface 21D side in the ty directions of the 3D shape measurement chip 20. The bonding wires 75A and 75B are examples of wirings for supplying power to the second light emitting element chip.

According to such an arrangement of the present exemplary embodiment, a current is supplied to each VCSEL-B of the 3D shape measurement chip 20 symmetrically from the ±y directions of the 3D shape measurement chip 20. Therefore, as compared with a third comparative example of the arrangement shown in FIG. 13D to be described later, in the arrangement of the present exemplary embodiment, the current is easily supplied to each VCSEL-B of the 3D shape measurement chip 20 more uniformly.

Since no bonding wire is provided on the side surface 21A side in the −x direction of the 3D shape measurement chip 20 on which the light quantity monitoring light receiving element 40 is arranged, it is easy to arrange the light quantity monitoring light receiving element 40 close to the 3D shape measurement chip 20. Therefore, in the arrangement of the present exemplary embodiment, it is easy for the light quantity monitoring light receiving element 40 to receive the light reflected by the diffusion plate 30 among emitted light from the 3D shape measurement chip 20, as compared with a second comparative example of the arrangement shown in FIG. 13C to be described later.

In the first modification of the arrangement shown in FIG. 13B, the light quantity monitoring light receiving element 40 is arranged on the side surface 21B side in the +x direction of the 3D shape measurement chip 20 and outside the proximity detection chip 10. That is, as compared with the arrangement in the present exemplary embodiment shown in FIG. 13A, a distance between the 3D shape measurement chip 20 and the light quantity monitoring light receiving element 40 is increased Therefore, a received light quantity of the light reflected by the diffusion plate 30 among the emitted light from the 3D shape measurement chip 20 is reduced, and the light reflected by the diffusion plate 30 is less likely to be received. Therefore, a detection accuracy may decrease.

In the second modification of the arrangement shown in FIG. 13C, the light quantity monitoring light receiving element 40 is arranged on the side surface 21B side in the +x direction of the 3D shape measurement chip 20 and between the 3D shape measurement chip 20 and the proximity detection chip 10. Therefore, it is easy to arrange the light quantity monitoring light receiving element 40 close to the 3D shape measurement chip 20. Therefore, similar to the arrangement in the present exemplary embodiment shown in FIG. 13A described above, in the second modification of the arrangement, it is easy to supply the current to each VCSEL-B of the 3D shape measurement chip 20 more uniformly, and it is easy for the light quantity monitoring light receiving element 40 to receive the light reflected by the diffusion plate 30 among the emitted light from the 3D shape measurement chip 20.

In the third modification of the arrangement shown in FIG. 13B, the bonding wire 75A provided in the present exemplary embodiment shown in FIG. 13A is not provided. Instead, in the third modification, an anode pattern is separately provided on the circuit substrate 7 on the side surface 21A side in the −x direction of the 3D shape measurement chip 20, and bonding wires 75C for connecting the anode electrode 218 of the 3D shape measurement chip 20 and the anode pattern separately provided on the circuit substrate 7 is provided. Although plural bonding wires 75C are provided, one of the bonding wires 75C is denoted by a reference numeral.

In the third modification of the arrangement shown in FIG. 13D, the proximity detection chip 10 is provided on a side surface 21D side in the −y direction of the 3D shape measurement chip 20, and the light quantity monitoring light receiving element 40 is provided on the side surface 21B side in the +x direction of the 3D shape measurement chip 20. In this way, the 3D shape measurement chip 20 and the light quantity monitoring light receiving element 40 are arranged close to each other. However, the current is supplied to the VCSEL-B of the 3D shape measurement chip 20 from two sides including a side surface 21C side in the ty direction and the side surface 21A side in the −x direction, so that it is difficult for the current to flow uniformly to each VCSEL-B of the 3D shape measurement chip 20. Therefore, the third modification may be used in a specification with a little influence even when it is difficult for a current to flow uniformly.

In the configuration described above, the light-emission device 4 and the 3D sensor 6 are arranged on a common circuit substrate 7, but may be arranged on different circuit substrates. Further, in the light-emission device 4, at least the proximity detection chip 10, the 3D shape measurement chip 20, the diffusion plate 30, and the side wall 33 may be provided on a substrate different from the circuit substrate 7, and these parts may be configured as one light emitting component (module) so as to be connected to the circuit substrate 7 on which the first drive unit 50A, the second drive unit 50B, the 3D sensor 6, and the like are mounted. As an example, a maximum outer shape of the light emitting component may be defined by the diffusion plate 30 covering the proximity detection chip 10 and the 3D shape measurement chip 20, the side wall 33, and the substrate. With such a configuration, since the first drive unit 50A, the second drive unit 50B, the 3D sensor 6, and the like are not mounted on the light emitting component, the light emitting component is provided and distributed as a small component. Further, since the proximity detection chip 10 and the 3D shape measurement chip 20 are sealed by being surrounded by the diffusion plate 30, the side wall 33, and the substrate, the dustproof, the moistureproof, and the like may be realized as compared with a case where the proximity detection chip 10 and the 3D shape measurement chip 20 are not sealed. The light emitting component may include or may not include the light quantity monitoring light receiving element 40.

Further, the proximity detection chip 10 in the above configuration is not necessarily used in combination with the 3D shape measurement chip 20. For example, the proximity detection chip 10 may be provided alone as a light emitting element chip for distance measurement, regardless of whether or not a 3D shape is measured. That is, the proximity detection chip 10 may be provided as a single vertical cavity surface emitting laser element array having plural long resonator structures connected in parallel to each other. In such a configuration, when the light emitting element chip is driven in a range lower than a range in which the power conversion efficiency may be maximized (for example, 4 mW or more and 8 mW or less), the light density is increased while preventing an increase in the spread angle, as compared with a case where the light emitting element chip is driven within a range in which the power conversion efficiency of only one surface emitting laser element may be maximized. In such a case, particularly in a configuration in which a visual field range of a light receiving unit is small and light is emitted in a range larger than the visual field range of the light receiving unit on an irradiation surface, light may be received in a higher SN ratio.

Further, the proximity detection chip 10 configured as described above may be applied not only to the light emitting element chip for distance measurement, but also to other applications in which a light density is desired to be increased while preventing an increase in a spread angle.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
a first light emitting element chip that emits lights toward an object to be measured;
a second light emitting element chip that emits lights toward the object to be measured, the second light emitting chip having a light output higher than a light output of the first light emitting element chip, the second light emitting element chip being configured to be driven independently from the first light emitting element chip and arranged side by side with the first light emitting element chip;
a light diffusion member including a first region provided on an emission path of the first light emitting element chip and a second region provided on an emission path of the second light emitting element chip, and having a diffusion angle at the second region larger than a diffusion angle at the first region;
a first light receiving unit configured to receive reflected light emitted from the second light emitting element chip and reflected by the second region of the light diffusion member;
a second light receiving unit configured to receive first reflected light emitted from the first light emitting element chip and reflected by the object to be measured and second reflected light emitted from the second light emitting element chip and reflected by the object to be measured; and
a control unit configured to control the second light emitting element chip such that light is emitted from the second light emitting element chip only in a case where the first reflected light indicates that the object to be measured is present within a predetermined distance,
wherein the second light emitting element chip includes a first side surface, a second side surface opposite to the first side surface, a third side surface connecting the first side surface and the second side surface, and a fourth side surface provided opposite to the third side surface and connecting the first side surface and the second side surface, and
the first light receiving unit is arranged on a first side surface side, and the first light emitting element chip is arranged on a second side surface side.

2. The optical device according to claim 1, wherein the first region is configured not to increase a spread angle of light emitted from the first light emitting element chip.

3. The optical device according to claim 2, wherein the first region is provided with an optical element that reduces the spread angle of the light emitted from the first light emitting element chip.

4. The optical device according to claim 2, wherein the first region is a through hole provided at the light diffusion member.

5. The optical device according to claim 1, wherein the first region is surrounded by the second region.

6. The optical device according to claim 1, wherein the first light emitting element chip includes at least one first light emitting element,
the second light emitting element chip includes at least one second light emitting element, and
a spread angle of light emitted from the first light emitting element toward the first region is smaller than a spread angle of light emitted from the second light emitting element toward the second region.

7. The optical device according to claim 6, wherein the first light emitting element is a laser element that emits single-mode light, and
the second light emitting element is a laser element that emits multi-mode light.

8. The optical device according to claim 1, wherein a distance from an emission surface of the first light emitting element chip to the light diffusion member is shorter than a distance from an emission surface of the second light emitting element chip to the light diffusion member.

9. The optical device according to claim 6, wherein the at least one second light emitting element includes a plurality of second light emitting elements, and
an arrangement interval between the first light emitting element and the second light emitting element is larger than an arrangement interval between the plurality of second light emitting elements.

10. The optical device according to claim 9, wherein each of the first light emitting element and the second light emitting element is a vertical cavity surface emitting laser element, and
driving is performed such that a light output emitted from one vertical cavity surface emitting laser element that is the first light emitting element is smaller than a light output emitted from one vertical cavity surface emitting laser element as the second light emitting element.

11. The optical device according to claim 9, wherein each of the first light emitting element and the second light emitting element is a vertical cavity surface emitting laser element, and
a vertical cavity surface emitting laser element that is the first light emitting element is driven with a light output with which power conversion efficiency of the vertical cavity surface emitting laser element as the first light emitting element is lower than power conversion efficiency of a vertical cavity surface emitting laser element as the second light emitting element.

12. The optical device according to claim 10, wherein the driving is performed such that a light output of one vertical cavity surface emitting laser element as the first light emitting element is in a range of 1 mW or more and 4 mW or less, and
the driving is performed such that a light output of one vertical cavity surface emitting laser element as the second light emitting element is in a range of 4 mW or more and 8 mW or less.

13. The optical device according to claim 10, wherein
the number of the vertical cavity surface emitting laser element as the first light emitting element is one or more and 50 or less, and
the number of vertical cavity surface emitting laser elements as the second light emitting elements is 100 or more and 1000 or less.

14. The optical device according to claim 1, further comprising
a side wall surrounding the first light emitting element chip and the second light emitting element chip, wherein
the first light emitting element chip and the second light emitting element chip are covered with the light diffusion member that is supported by the side wall.

15. The optical device according to claim 1, further comprising
a plurality of wirings connected to the second light emitting element chip and configured to supply power to the second light emitting element chip, wherein
the plurality of wirings are provided at a side of the third side surface and a side of the fourth side surface.

16. The optical device according to claim 1, wherein the second light receiving unit outputs a signal corresponding to a time from when light is emitted from the first light emitting element chip to when the light is received by the second light receiving unit, and a signal corresponding to a time from when light is emitted from the second light emitting element chip to when the light is received by the second light receiving unit.

17. An information processing device comprising:
the optical device according to claim 1; and
a shape specifying unit configured to specify a three-dimensional shape of the object to be measured based on the second reflected light emitted from a plurality of the second light emitting element chips of the optical device, reflected by the object to be measured, and received by the second light receiving unit of the optical device.

18. The information processing device according to claim 17 further comprising:
an authentication processing unit configured to perform authentication processing related to use of the information processing device based on a specification result of the shape specifying unit.

* * * * *